United States Patent
Satyanarayanan

(10) Patent No.: US 9,330,145 B2
(45) Date of Patent: May 3, 2016

(54) SYSTEMS AND METHODS FOR CONTEXT-AWARE MESSAGE TAGGING

(71) Applicant: salesforce.com, inc., San Francisco, CA (US)

(72) Inventor: Rajaram Satyanarayanan, San Jose, CA (US)

(73) Assignee: salesforce.com, inc., San Francisco ( * ) Notice: Subject to any disclaimer, the term of this patent is extended or adjusted under 35 U.S.C. 154(b) by 128 days.

(21) Appl. No.: 13/768,145

(22) Filed: Feb. 15, 2013

(65) Prior Publication Data

US 2013/0218877 A1  Aug. 22, 2013

Related U.S. Application Data

(60) Provisional application No. 61/601,909, filed on Feb. 22, 2012.

(51) Int. Cl.
*G06F 17/30* (2006.01)
*G06Q 30/00* (2012.01)
*H04L 12/58* (2006.01)

(52) U.S. Cl.
CPC ...... *G06F 17/3053* (2013.01); *G06F 17/30699* (2013.01); *G06Q 30/016* (2013.01); *H04L 51/04* (2013.01)

(58) Field of Classification Search
CPC ............... G06F 17/30864; G06F 17/30867
USPC ............ 707/748, 770, 722, 723, 737, 3, 711, 707/790, 769, 741; 715/740, 736, 708
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Mariela Reyes
*Assistant Examiner* — Thong Vu
(74) *Attorney, Agent, or Firm* — Dergosits & Noah LLP; Todd A. Noah

(57) ABSTRACT

Disclosed are systems, apparatus, and methods for context-aware messaging. In various implementations, a conversation between two or more users may be hosted by a communications tool, where the conversation generates text included in a conversation thread. Context attributes may be extracted from the generated text. The context attributes may describe interactions and data objects associated with one or more entities. One or more scores may be assigned to the extracted context attributes based on the contents of the conversation thread. The scores may provide a rank for each of the extracted context attributes. A presentation of a user interface of a communication tool may be modified based on the one or more scored context attributes.

20 Claims, 13 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,073,129 B1 * | 7/2006 | Robarts et al. ............... 715/740 |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,126,759 B2 | 2/2012 | Robertson et al. |
| 8,150,913 B2 | 4/2012 | Cheah et al. |
| 8,195,693 B2 * | 6/2012 | Syeda-Mahmood ......... 707/790 |
| 8,275,836 B2 | 9/2012 | Beaven et al. |
| 8,549,412 B2 | 10/2013 | Brezina et al. |
| 8,650,210 B1 * | 2/2014 | Cheng et al. ................. 707/770 |
| 8,880,530 B2 * | 11/2014 | Brdiczka et al. .............. 707/739 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0083025 A1 * | 6/2002 | Robarts et al. ................. 706/12 |
| 2002/0105550 A1 * | 8/2002 | Biebesheimer et al. ...... 345/835 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0271340 A1 | 11/2007 | Goodman et al. |
| 2008/0077558 A1 * | 3/2008 | Lawrence et al. .................. 707/3 |
| 2009/0063415 A1 | 3/2009 | Chatfield et al. |
| 2009/0240647 A1 * | 9/2009 | Green et al. ..................... 706/52 |
| 2010/0076994 A1 * | 3/2010 | Soroca et al. ................. 707/769 |
| 2011/0093467 A1 | 4/2011 | Sharp et al. ................... 707/741 |
| 2011/0208816 A1 * | 8/2011 | Chavez ......................... 709/206 |
| 2011/0238673 A1 | 9/2011 | Carter et al. .................. 707/748 |
| 2011/0302149 A1 * | 12/2011 | Vadlamani et al. ........... 707/711 |
| 2013/0007011 A1 * | 1/2013 | Setlur et al. ................... 707/748 |
| 2013/0014040 A1 * | 1/2013 | Jagannathan et al. ........ 715/765 |
| 2013/0104046 A1 * | 4/2013 | Casco-Arias Sanchez et al. ............................ 715/736 |

* cited by examiner

SYSTEMS AND METHODS FOR CONTEXT-AWARE MESSAGE TAGGING

CLAIM OF PRIORITY

This application claims the benefit of U.S. Provisional Patent Application 61/601,909 entitled SYSTEMS AND METHODS FOR CONTEXT-AWARE MESSAGE TAGGING, by Rajaram Satyanarayanan, filed Feb. 22, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to online social networking and messaging systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Organizations and enterprises typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations and enterprises increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF SUMMARY

Disclosed are systems, methods, and apparatus for context-aware messaging. In some implementations, a method for providing a contextual view for a communication tool is provided. The method may comprise hosting a conversation between two or more users, the conversation generating text included in a conversation thread; extracting context attributes from the generated text, the context attributes describing interactions and data objects associated with one or more entities; assigning one or more scores to the extracted context attributes based on the contents of the conversation thread, the scores providing a rank for each of the extracted context attributes; and modifying a presentation of a user interface of the communication tool based on the one or more scored context attributes.

In some implementations, the extracting comprises parsing and analyzing text included in the conversation thread. Furthermore, the analyzing may comprise comparing the parsed text with a list of entities associated with an on-demand service. In various implementations, one or more context attributes may be extracted from a context data store based on one or more entities extracted from the conversation thread. The scores may be assigned based on one or more context attributes associated with the two or more users of the conversation thread. Furthermore, the modifying may comprise displaying a ranked list of the scored context attributes. In some implementations, the ranked list is displayed in a data field, the data field annotating the conversation thread with one or more context attributes in response to receiving an input. The method may further comprise monitoring context attributes included in the conversation thread in real-time, and in response to determining that one or more context attributes has changed, updating the presentation of the user interface based on the one or more changed context attributes. The modifying may comprise altering a presentation of text included in the conversation thread, the presentation being selected from a group consisting of: a font, a size, a style, and a color. The modifying may comprise changing a format of one or more user interface components included in the user interface to a format that is compatible with a mobile communications device. The context attributes may include connection event data retrieved from a connection event database.

According to various implementations, a non-transitory machine-readable medium is provided that carries one or more sequences of instructions which, when executed by one or more processors, cause the one or more processors to carry out the steps of: hosting a conversation between two or more users, the conversation generating text included in a conversation thread; extracting context attributes from the generated text, the context attributes describing interactions and data objects associated with one or more entities; assigning one or more scores to the extracted context attributes based on the contents of the conversation thread, the scores providing a rank for each of the extracted context attributes; and modifying a presentation of a user interface of a communication tool based on the one or more scored context attributes.

In some implementations, an apparatus is provided that comprises a processor; and one or more stored sequences of instructions which, when executed by the processor, cause the processor to carry out the steps of: hosting a conversation between two or more users, the conversation generating text included in a conversation thread; extracting context attributes from the generated text, the context attributes describing interactions and data objects associated with one or more entities; assigning one or more scores to the extracted context attributes based on the contents of the conversation thread, the scores providing a rank for each of the extracted context attributes; and modifying a presentation of a user interface of a communication tool based on the one or more scored context attributes.

Conventional methods may provide a user with a way to communicate with another user via online communications. For example, a user may use an instant messaging program to have a conversation with another user. However, conventional methods are limited because they do not provide a user with an interface to other systems and sources of information. Thus, the user is not provided with the ability to automatically identify and retrieve other information related to the conversation from other relevant sources. Thus, if a first user is communicating with a second user about a case, the users may have to manually and separately access a separate system to access a file or record associated with the case. In many situations, the users might not be able to access the associated file at all. Furthermore, conventional methods do not provide users with an interface between a communication tool, such as an instant messaging service, and an online social network. Thus, if two users have a conversation using an instant messaging service, they cannot share that conversation or contextual information associated with the conversation in an information feed of the online social network.

In various implementations disclosed herein, contextual information may be aggregated from various different systems and environments. The contextual information may be used to modify a presentation and functionality of a mode of communication. For example, a communication tool that implements the mode of communication, such as an instant messaging tool, may be modified based on contextual information. Thus, the user interface of the communication tool may be modified to include additional information related to a conversation thread based on a user's context. Context information may also be used to modify information stored in an information feed and modify a presentation of the information feed in an online social network. Thus, according to some implementations, context attributes identified and retrieved based on the contents of the conversation thread may be pushed to the information feed. The conversation thread and contextual information may then be rendered as part of the information feed and accessible to other entities in the online social network.

In an example of a use case, a customer may contact a salesperson with a question about a product. The salesperson may have previously interacted with the customer when the salesperson traveled to the customer's business organization to setup a software application. The customer might need follow up support and may have contacted the salesperson via an instant messaging service, such as Chatter® Instant Messenger. A context attribute interface may analyze the content of their conversation to identify and retrieve relevant contextual information. Thus, based on the entities involved in the conversation and the software application mentioned in the conversation, the context attribute interface may retrieve knowledge database articles and product information related to the software application. Moreover, the context attribute interface may retrieve information about the salesperson's previous visit to the customer. The context attribute interface may provide this information to the salesperson at the user interface of the communication tool. Thus, the context attribute interface may retrieve and present information from various different sources, such as a customer relationship management (CRM) database and knowledge databases. Moreover, the context attribute interface may use the content of the conversation to identify relevant information feeds and feed posts in an online social network that the salesperson uses. The context attribute interface may post the contents of the conversation in relevant information feeds so that other salespeople that subscribe to the feed may now see and access the conversation thread.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
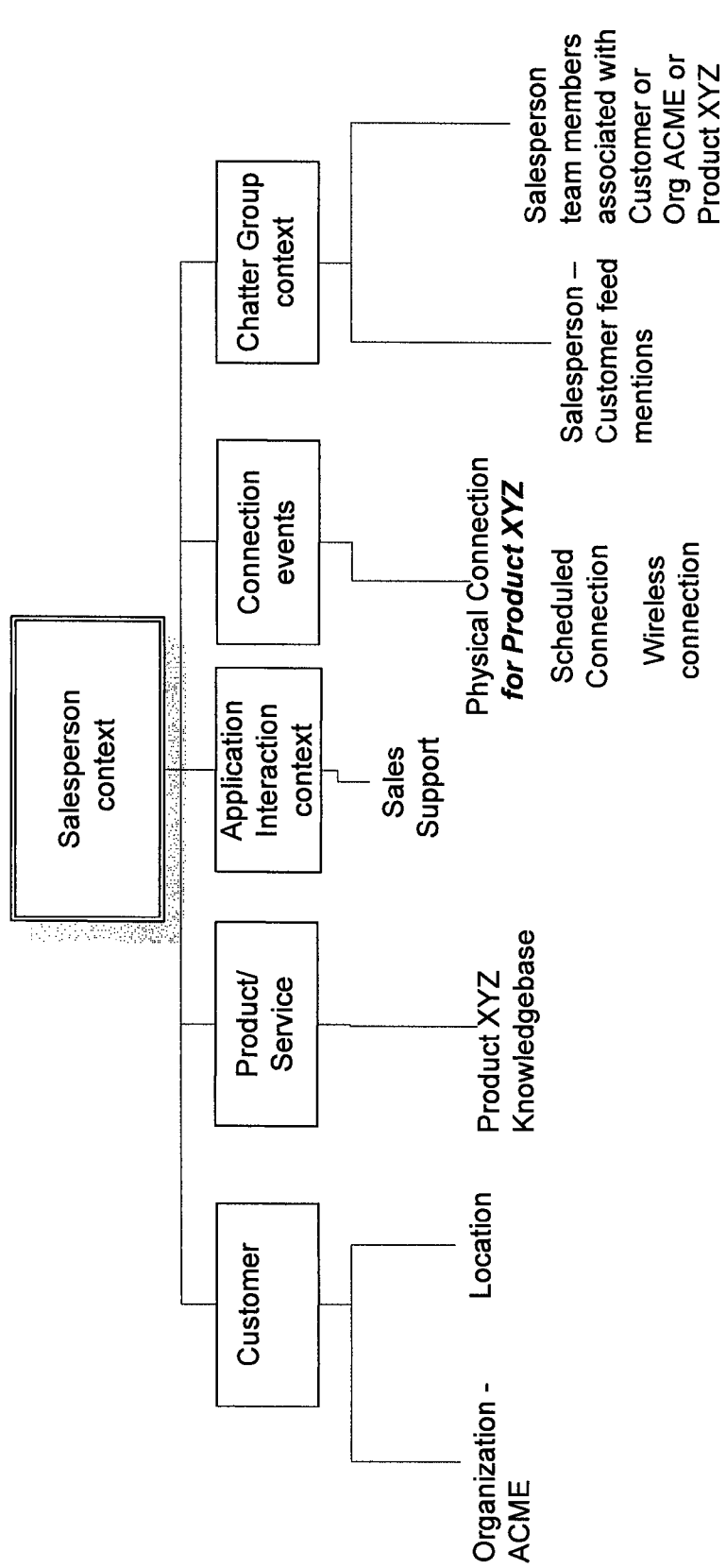
FIG. 1 shows a diagram of various different types of context attributes which may be associated with a user of a context-aware messaging system, in accordance with some implementations.

Systems and methods are provided for context-aware messaging. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks" or "steps," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for a context-aware messaging system that may interact with or include an online social network, also referred to herein as a social networking system or an enterprise social network. Feed items in an information feed may include information updates stored in an on-demand database service environment. In some implementations, the disclosed methods, apparatus, systems, and computer program products may be configured or designed for use in a multi-tenant database environment.

In some implementations, an online social network may allow a user to follow data objects in the form of records such as cases, accounts, or opportunities, in addition to following individual users and groups of users. One example of such an online social network is Chatter®, provided by Salesforce.com® of San Francisco, Calif. Such online social networks can be implemented in various settings, including enterprises such as business organizations or groups within such an organization. For instance, Chatter® can be used by employee users of a business organization to communicate and collaborate with each other for various purposes.

The "following" of a record stored in a database, as described in greater detail below, allows a user to track the progress of that record. Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein.

Examples of record updates include field changes in the record, as well as the creation of the record itself. Examples of other types of information updates, which may or may not be linked with a particular record depending on the specific use of the information update, include messages as described herein. Examples of such messages include posts such as explicit text or characters submitted by a user, multimedia data sent between or among users (for instance, included in a post), status updates such as updates to a user's status or updates to the status of a record, uploaded files, indications of a user's personal preferences such as "likes" and "dislikes," and links to other data or records.

Information updates can also be group-related, e.g., a change to group status information for a group of which the user is one of possibly additional members. A user following, e.g., subscribed to, a record is capable of viewing record updates on the user's news feed, which can also include the other various types of information updates described above. Any number of users can follow a record and thus view record updates in this fashion. Some records are publicly accessible, such that any user can follow the record, while other records are private, for which appropriate security clearance/permissions are a prerequisite to a user following the record.

Online social networks are increasingly becoming a common way to facilitate communication between individuals and groups of individuals, any of whom can be recognized as "users" of a social networking system. In many social networks, individuals may establish connections with one other, which may be referred to as "friending" one another. By establishing such a connection, one user may be able to see information generated by or associated with another user. For instance, a first user may be able to see information posted by a second user to the first user's personal social network page. One implementation of such a personal social network page is a user's profile page, for example, in the form of a web page representing the user's profile. For example, a post submitted by the second user about the first user can be presented on the first user's profile feed, also referred to herein as the user's "wall," which can be displayed on the first user's profile page.

In some implementations, an information feed in the context of a social network may be a collection of information selected from the social network for presentation in a user interface. The information presented in the information feed may include posts to a user's wall or any other type of information accessible within the social network. A feed item can include various types of data including character-based data, audio data, video data, or combinations of these. For instance, a post can include text in combination with a JPEG image or animated image.

Feed items in information feeds such as a user's news feed may include messages, which can take the form of: posts comprising textual/character-based inputs such as words, phrases, statements, questions, emotional expressions, symbols, leetspeak, or combinations of these; responses to posts, also referred to herein as "comments", such as words, phrases, statements, answers, questions, reactionary emotional expressions, or combinations of these; indications of personal preferences which can be submitted as responses to posts or comments; status updates; and hyperlinks. In other examples, messages can be in the form of file uploads, such as presentations, documents, multimedia files, and the like.

In some implementations, a news feed may be specific to an individual user, a group of users, or a data object (e.g., a file, document, Web page, or a collection of documents, files, or Web pages). For instance, a group of users on a social network may publish a news feed. Members of the group and the larger social network may view and post to the group news feed in accordance with a permissions configuration for the news feed and the group.

In some implementations, when data such as posts or comments input from one or more users are published to an information feed for a particular user, group, object, or other construct within a social network, an e-mail notification or other type of notification (e.g., text message) may be transmitted to all users following the user, group, or object in addition to the posting of the published data as a feed item in one or more feeds, such as a news feed or a record feed. In some social networks, the occurrence of such a notification is limited to the first instance of a published input, which may form part of a larger conversation. For instance, a notification may be transmitted for an initial post, but neither for comments on the post nor for follow-up posts related to the initial post. In some other implementations, notifications are transmitted for all such published inputs.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post published by a user. Feed items of information about a user can be presented in a user's profile feed of the database, while feed items of information about a record can be presented in a record feed in the database, by way of example. A profile feed and a record feed are examples of different information feeds. A second user following a first user or record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. Other similar sections of a user's profile can also include an "About" section. A record can also have a status, the update of which can be provided by an owner of the record or other users having suitable write access permissions to the record. The owner can be a single user, multiple users, or a group. In one implementation, there is only one status for a record.

In one implementation, a comment can be made on any feed item. In another implementation, comments are organized as a list explicitly tied to a particular feed tracked update, post, or status update. In this implementation, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In one implementation, a "group feed" includes any feed item about any user in a group. In another implementation, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" is a feed of feed items about a particular user. In one implementation, the feed items for a profile feed are posts and comments that other users make about or send to the particular user, and status updates made by the particular user. Such a profile feed can be displayed on a page associated with the particular user. In another implementation, feed items in a profile feed could include posts made by the particular user and feed tracked updates initiated based on actions of the particular user.

In various implementations, systems, apparatus, and methods are provided for context-aware messaging. Contextual information that relates to a user's current context may be aggregated from various different systems and environments or determined based on actions taken by the user or other entities. Contextual attributes included in the contextual information may be integrated into on-demand services that the user subscribes to, such as an instant messaging service and an online social network. In some implementations, a context attribute is data or information that describes a user's interactions with or relation to other entities in an on-demand service environment. Contextual attributes may be a result of on-demand products or services being used to interact with other entities, such as other users of an on-demand service or online social network. Contextual attributes may be determined, gathered, and/or used by various systems and subsystems, such as Text Analytics or a Chatter® group administrative setup.

FIG. 1 shows a diagram of various different types of context attributes which may be associated with a user of a context-aware messaging system, in accordance with some implementations. As shown in FIG. 1, a user may be a salesperson who subscribes to services provided by an on-demand service provider, such as Salesforce.com®. In some implementations, a context attribute interface and a context data store may be provided as part of the services provided by the on-demand service provider. The context attribute interface and a context data store may retrieve and store contextual information and context attributes from various different sources and integrate the contextual information into existing services that the salesperson already subscribes to. For example, the salesperson may interact with a customer, who may be part of a particular organization that is situated at a particular location. The context attribute interface and the context data store may retrieve context attributes identifying the customer's name, a product that the customer bought, and an account associated with the customer's organization. Such information may be retrieved from a multi-tenant database system which may provide a customer relationship management (CRM) database.

The context attribute interface and the context data store may retrieve contextual information from other sources as well, such as a log or history file detailing the salesperson's interactions with an enterprise application, and various data objects within the enterprise application. Furthermore, the context attribute interface and the context data store may retrieve contextual information from an event database that stores connection events describing connections and interactions between the salesperson and other entities, such as the customer. Further still, the context attribute interface and the context data store may retrieve contextual information from a group of users that may be part of an online social network, such as Chatter® provided by Salesforce.com®. Thus, context information may be retrieved from multiple sources residing in multiple different database systems.

In some implementations, context information is used to modify a presentation and functionality of a mode of communication. Thus, a communication tool that implements the mode of communication, such as an instant messaging service that provides instant messaging capabilities, may be modified based on a user's current context. Context attributes associated with a conversation thread may be identified and retrieved. The context attributes may be scored and ranked based on the user's context. A user interface of the communication tool may be modified to include the most relevant context attributes. In this way, the user interface of the communications tool may be modified to include additional information related to a conversation thread based on the user's context.

Context information may also be used to modify information stored in an information feed and modify a presentation of the information feed in an online social network. In some implementations, context attributes identified and retrieved based on the contents of a conversation thread may be pushed to an information feed of an online social network. The context attributes may be used to identify relevant information feeds and feed posts. The conversation thread and the context attributes may be stored as a data object associated with the identified information feeds and feed posts. The data object may be rendered and presented as part of the information feed, thus making the conversation thread and context attributes available to any entity subscribing to the feed. Thus, contextual information may be retrieved and aggregated from various different sources, and integrated into an online social network that may be provided as an on-demand database service.

Figure 2:
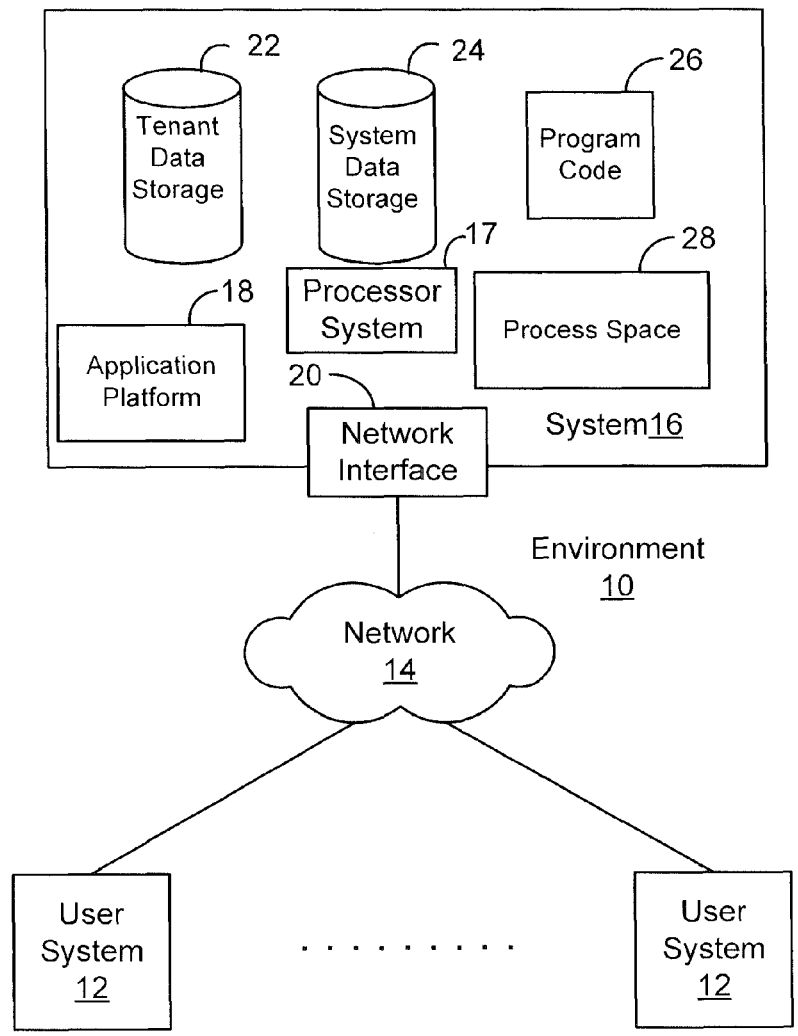
FIG. 2 shows a block diagram of an example of an environment 10 in which an on-demand database service can be used in accordance with some implementations.

FIG. 2 shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be any machine or system that is used by a user to access a database system 16. For example, any of user systems 12 can be a handheld computing device, a mobile phone, a laptop computer, a work station, and/or a network of such computing devices. As illustrated in FIG. 2 user systems 12 might interact via a network 14 with an on-demand database service, which is implemented in the example of FIG. 2 as database system 16.

An on-demand database service, such as system 16, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 2, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 2, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 2 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. A computer program product implementation includes a non-transitory machine-readable storage medium (media) having instructions stored thereon/in, which can be used to program a computer to perform any of the processes/methods of the implementations described herein. Computer program code 26 for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 3:
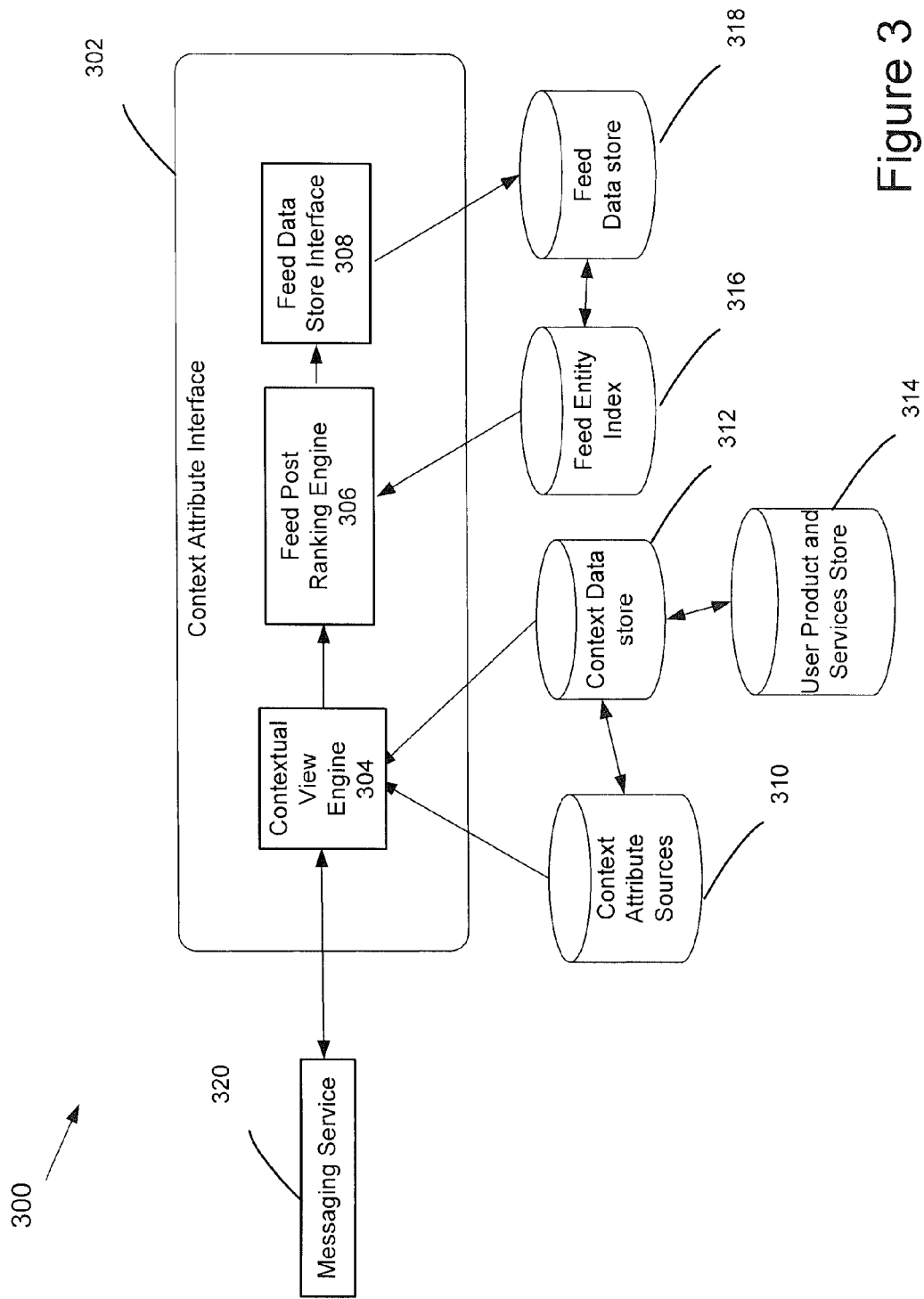
FIG. 3 shows a block diagram of an example of a system in which contextual attributes may be stored and used, in accordance with some implementations.

FIG. 3 shows a block diagram of an example of a system in which contextual attributes may be stored and used, in accordance with some implementations. System 300 provides an interface that integrates context information from various different social networks, collaborative environments, and modes of communication. Thus, context information may be aggregated from many different database systems that may be used to provide different services and manage different user accounts. System 300 may include context attribute interface 302, contextual view engine 304, feed post ranking engine 306, feed data store interface 308, context attribute sources 310, context data store 312, user products and services store 314, feed entity index 316, feed data store 318, and messaging service 320.

Context attribute interface 302 may be an application program that processes context information and manages interactions between various sources of context information, one or more collaborative environments or social networks, and various different modes of communication, such as messaging service 320. Collaborative networks and social networks may refer to online social networks such as Facebook®, Twitter®, and Chatter®. Modes of communication may include an instant messaging service, such as Chatter® Instant Messenger, or any other synchronous or asynchronous messaging system. Thus, context attribute interface 302 may include one or more components that manage the storing, retrieval, and sharing of context attributes among various different components of system 300. Context attribute interface 302 may be a software application implemented in one or more servers that include hardware and software configured to execute instructions from a non-transitory computer readable medium. Context attribute interface 302 may be a specific instance of a software application that has been instantiated for a user's account as part of an on-demand service that the user subscribes to. Alternatively, context attribute interface 302 may be a shared resource that multiple users may access.

Context attribute interface 302 may include contextual view engine 304, which may generate a view or an appearance of a mode of communication based on various information, which may include context information. In some implementations, the mode of communication is a messaging service, such as messaging service 320, which may be part of an on-demand service that a user subscribes to, such as Chatter® Instant Messenger. Context attribute interface 302 may be communicatively coupled to messaging service 320 and may be configured to retrieve information from and send information to messaging service 320. Furthermore, contextual view engine 304 may be configured to generate and render a user interface of messaging service 320 based on one or more context attributes retrieved from various context sources. Accordingly, contextual view engine 304 may include a rendering engine capable of rendering various user interface components that may be presented in and as part of a user interface in a browser or dialog window. The rendering engine may be configured by a user or an administrator to configure how contextual view engine 304 renders context information. Contextual view engine 304 may be coupled to various context attribute sources, as discussed in greater detail with reference to FIG. 4. Contextual view engine 304 may also be coupled to one or more context data stores, such as context data store 312. Thus, contextual view engine may have access to numerous sources of context attributes, and may incorporate relevant context attributes into a presentation of one or more conversation threads in messaging service 320.

Context attribute interface 302 may further include feed post ranking engine 306, which may score and rank information feeds and posts made within the information feeds based on context information and information parsed from one or more modes of communication used by users. For example, feed post ranking engine 306 may extract information from conversation threads, such as identifiers associated with entities, and use the extracted information to weight search terms which may be used to identify relevant information, such as feed posts. In this way, feed post ranking engine 306 may score and rank information retrieved from information feeds in one or more social networks based on information parsed from a conversation thread that a user had in messaging system 320, which might not be associated with the social networks, and might be part of a different system entirely.

Accordingly, feed post ranking engine 306 may include a parsing engine capable of parsing text. Contextual view engine 304 may provide one or more conversation threads to the parsing engine of feed post ranking engine 306. The parsing engine may be capable of performing one or more operations to extract text and identifiers associated with entities associated with the received conversation thread, such as the entities having the conversations or entities mentioned in the conversation. Alternatively, contextual view engine 304 may include a parsing engine and may parse information from conversation threads and send the parsed information to feed post ranking engine 306. Feed post ranking engine 306 may be communicatively coupled to feed entity index 316, and may be configured to query a data store included in feed entity index 316 to identify one or more data values based on search terms weighted by the previously described parsed information. Thus, feed post ranking engine 306 may analyze information and terms parsed from messages and conversation threads to generate scores associated with the information. The scores may be determined based on one or more factors, such as a frequency of appearance or a relevance to a user. The scores may represent a weight affixed to each term in a subsequent query. Accordingly, feed post ranking engine 306 may be configured to generate and conduct a database query in which search terms are weighted based user interactions in messaging system 320. Results of the query may be ranked based on weights associated with the search terms underlying the query. Thus, the results may identify feed information that has been ranked based on user interactions in a messaging system.

Context attribute interface 302 may further include feed data store interface 308, which may provide an interface to one or more feed data stores and may manage the modification or retrieval of information from the one or more feed data stores. Feed data store interface 308 may be coupled to feed post ranking engine 306 and may be configured to receive scoring and ranking information from feed post ranking engine 306. Feed data store interface 308 may manage the scoring and ranking of data values stored in feed data store 318 based on the received scoring and ranking information. In some implementations, a feed data store, such as feed data store 318 stores information about information feeds in one or more social networks or collaborative environments. The information may be data related to posts in the feeds, such as feed topics and identifiers of authors of posts. The information may also be metadata associated with the feeds, such as a timestamp associated with the creation of a feed or a post within the feed. Thus, feed data store interface 308 may manage the ranking and scoring of data related to information feeds that is stored in feed data store 318. The scoring and ranking of information stored in feed data store 318 may be applied globally, in a manner specific to a user, or in a manner specific to a group of users. Furthermore, feed data store interface 308 may manage the updating of data stored in feed data store 318 when information feeds are updated based on information parsed from one or more conversation threads.

Context attribute sources 310 may be one or more sources of context information. As similarly set forth above with reference to FIG. 1, context attribute sources 310 may refer to various sources of context information which may be reside in different systems associated with different groups of users. For example, context attribute sources may include a connection database that stores physical interaction data, external knowledge databases, a user's history of actions, a CRM database, and other applications or online services, such as an email application or a calendaring application.

Context data store 312 may store retrieved context information. Thus, context data store may include one or more storage volumes that store context attributes associated with one or more users. Context data store 312 may be accessible by several users and may provide a centralized repository for context information for several users. Alternatively, context data store 312 may be specific to a particular user and provided as part of an on-demand service that the user subscribes to. As discussed in greater detail with reference to FIG. 4, context data store 312 may be coupled to context attribute sources 310, and may retrieve and aggregate information directly from context attribute sources 310. Context data store 312 may also be coupled to contextual view engine 304 and may provide context information and context attributes to contextual view engine 304 when requested.

User products and services store 314 may store information related to services and products that a user subscribes to. For example, a user may subscribe to one or more one-demand services provided by an on-demand service provider. As part of the subscription process, the user may have created an account in which the user provides various information, such as a username and other biographical information. Moreover, the user may also have information associated with the user's account, such as the name of an organization that that the user belongs to. Thus, information retrieved from and associated with a user's profile may be stored in user products and services store 314 and provided to context data store 312 as context attributes.

Feed entity index store 316 may store one or more indexes generated based on information associated with a collaborative environment or social network. Feed entity index store 316 may generate and store indexes which may be made available to feed post ranking engine 306, thus enabling feed post ranking engine 306 to search, score, and rank information from various information feeds stored in feed data store 318. Accordingly, feed entity index store 316 may include a parsing engine configured to retrieve and parse information from feed data store 318. The parsing engine may be configured to analyze one or more data structures used to store feed information, such as feed posts, and extract one or more data values, such as names and unique identifiers for entities associated with the feed information, such as a person or organization that posted a feed post or was mentioned in a feed post. Feed entity index store 316 may generate and store one or more indexes based on the extracted information. The indexes provide the feed post ranking engine 306 with an organized representation of relevant feed information that may be searched quickly and efficiently.

Figure 4:
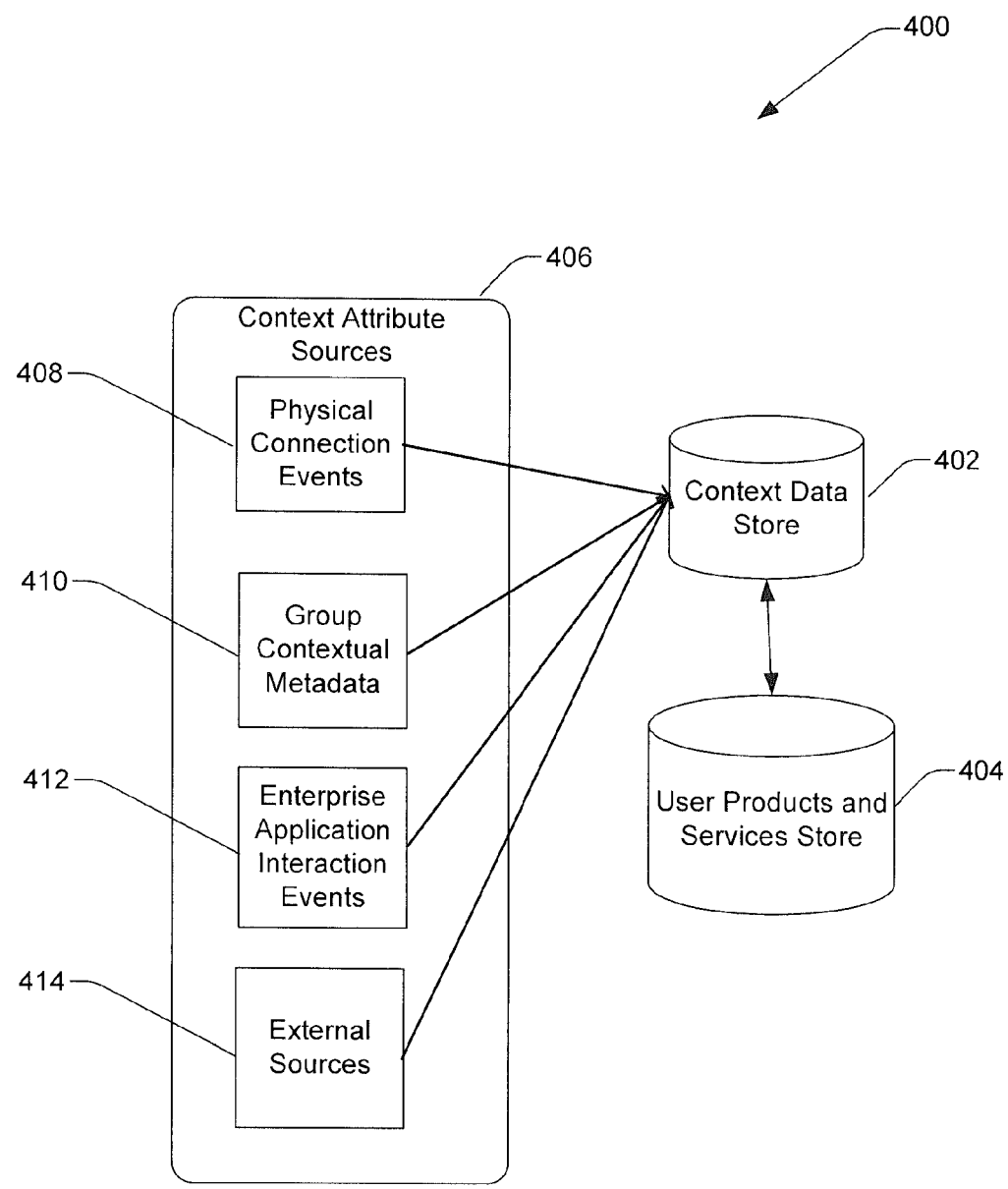
FIG. 4 shows a block diagram of an example of a system in which a contextual information, such as context attributes, may be aggregated and stored in a context data store, in accordance with some implementations.

FIG. 4 shows a block diagram of an example of a system in which a contextual information, such as context attributes, may be aggregated and stored in a context data store, in accordance with some implementations. Thus, FIG. 4 provides additional detail regarding how context attributes may be stored in a context data store. Accordingly, system 400 may include context data store 402, user products and services store 404, and context attribute sources 406, which may include physical connection events 408, group contextual metadata 410, enterprise application interaction events 412, and external sources 414.

As similarly discussed with reference to FIG. 3, context data store 402 may include one or more storage volumes that store context attributes associated with one or more users. Context data store 402 may be accessible by on-demand services subscribed to by one or more users. For example, a user may subscribe to services such as an online social network and an instant messaging service, which may both have access to context data store 402. In some implementations, context data store 402 may passively receive information that is pushed from context attribute sources 406. Alternatively, context data store 402 may actively poll context attribute sources 406 to retrieve context attributes. Thus, context data store 402 may broadcast a request for context data attributes to context attribute sources 406. It will be appreciated that context data store 402 may perform some combination of both passively receiving and actively retrieving information from context attribute sources 406.

Context attribute sources 406 may refer to any number of sources of information that may include context attributes. Context attribute sources 406 may be located in the same network, or even same database as context data store 402. Context attribute sources 406 may be located in a separate network, and may provide information to context data store 402 via the Internet using a web communications protocol.

Furthermore, context attribute sources 406 may include physical connection events 408 which may determined based on physical and wireless interactions between users or between users and objects. For example, the frequency of interaction between users can be used to measure the interaction strength of their relationship. In some implementations, actions external to the online social network can be used to affect the interaction strength of users in an online social network.

Interaction strength information can be shared to the extent allowed by settings. All social network users, or only those users who follow the first user, or only the first user can view the interaction strength on first user's profile page. Interaction strength can be based on metrics, such as the number of interactions within a defined time period (i.e., frequency), the length of interaction, and the like. This interaction strength calculation can consider interactions outside of the online social network, such as interactions observed with a CRM system. A first user's interactions with a second user recorded in the CRM system can be provided to the social network and used to determine interaction strength. In yet another implementation, interaction strength can also be based upon multiple social network interactions.

Physical interactions are captured based on wireless interactions between mobile communication devices of two users. Use cases for peer-to-peer communication between the respective mobile devices and simultaneous interaction with a shared access point are described. These use cases have in common physical proximity of users. The proximity of mobile communication devices is used as a proxy for user interaction or at least for shared user experiences due to physical proximity.

Scheduled physical interactions are captured from calendar entries, event subscriptions, sign-ins and the like that place two users at the same event. The scheduled physical interactions may be analyzed when the user's respective privacy settings allow. Analysis of schedule physical interactions may be triggered by another interaction event, thereby reducing the potential intrusiveness of analyzing calendars.

Wireless communication interactions outside the social network can be monitored using observer software residing on respective mobile communication devices. The observer software can monitor video, audio and text communications channels that are out of band from the social network.

In each of these use cases, connection events such as physical connection event, calendar connection event or wireless connection event can be created and stored in a database. A physical connection event can be triggered by reception of a user identity token. The receiving device can record the duration and strength of the signal that broadcasted the user identity token. It also can record the number of token broadcasts received and optionally their timing or continuity. Similarly, a calendar connection event is a memory update caused by a find or match of calendar related electronic records of two users indicating their co-attendance at an event. Likewise, a wireless connection event is registered at a server when two users communicate with each other outside the social network using their respective wireless devices.

Moreover, the connection events can be processed to determine connectedness scores for pairs of users. Connectedness scores can be made available to users for their own connections and to permitted viewers.

In another example, context attribute sources 406 may include group contextual metadata 410. As previously discussed, a user may subscribe to an on-demand service that provides an online social network, such as Chatter®, that may be part of a collaborative environment. The user may belong to, subscribe to, or follow one or more groups of users on the online social network. The on-demand service provider may store and maintain various metadata associated with groups of users that use the online social network. The metadata may be stored in a data store, such as feed data store 318. The metadata may include data such as a number of users in a group, identifiers of users who belong to the group, and timestamp data associated with feed posts made within the group.

Thus, group metadata may be retrieved from a feed data store and stored in context data store 402 as context attributes.

In yet another example, context attribute sources 406 may include enterprise application interaction events 412, which may be events associated with one or more entities interacting with an enterprise application. Thus, enterprise application interaction events 412 may include one or more events generated by a user using an enterprise application. For example, a user may access or modify one or more data values in a customer relationship management (CRM) database that is operated and maintained as part of an enterprise application, such as a Service Cloud® console provided by Salesforce.com®. The user actions made when interacting with the CRM database may be monitored and logged, thus storing a history of actions taken by a user. Furthermore, in addition to storing actions taken by the user, data associated with the actions may be stored, such as identifiers associated with the data objects that were accessed or modified and data associated with those objects, such as other users or organizations that the data objects belongs to. For example, if the user modifies an attribute, such as a business address of a contact stored in the CRM database, a log may be kept of the modification. The log may store one or more identifiers identifying the action taken, a unique identifier for the contact for which a business address was modified, an organization that the contact belongs to, and various associated metadata, such as a timestamp indicating when the modification was made. This information may be logged and stored by the on-demand service provider, and provided to context data store 402 when requested. Each of the data values provided to context data store 402 may be stored and analyzed as context attributes.

In another example, context attribute sources 406 may include external sources 412. External sources may be any sources of contextual information that are located in or provided by networks, clouds, databases, or service providers that do not have unimpeded access to the online social network associated with context data store 402. For example, a user may subscribe to an online social network such as Chatter®. Chatter® may also provide the user with Chatter® Instant Messenger. In this instance, both the online social network and messaging service are provided by the same service provider, Salesforce.com®. Thus, both the online social network and messaging service may be tied to the same user account and have the ability to freely share information with each other. However, an external source, such as an email application provided by a third party, would not be able to freely share information because it does not have the requisite level of access to the user's account. Thus, an application program interface (API) may be provided that allows context data store 402 to access the user's email account, crawl email messages stored in the user's account, parse information from the email messages, and identify and retrieve contextual information from the email account, such as contact names, message topics, and associated metadata. It will be appreciated that external sources may refer to other external applications, such as a calendaring application.

As similarly discussed with reference to FIG. 3, context data store 402 may also retrieve information from user products and services store 404, which may include information related to services and products that a user subscribes to, such as account information, a username, other biographical information, and the identity of an organization that that the user belongs to.

Figure 5:
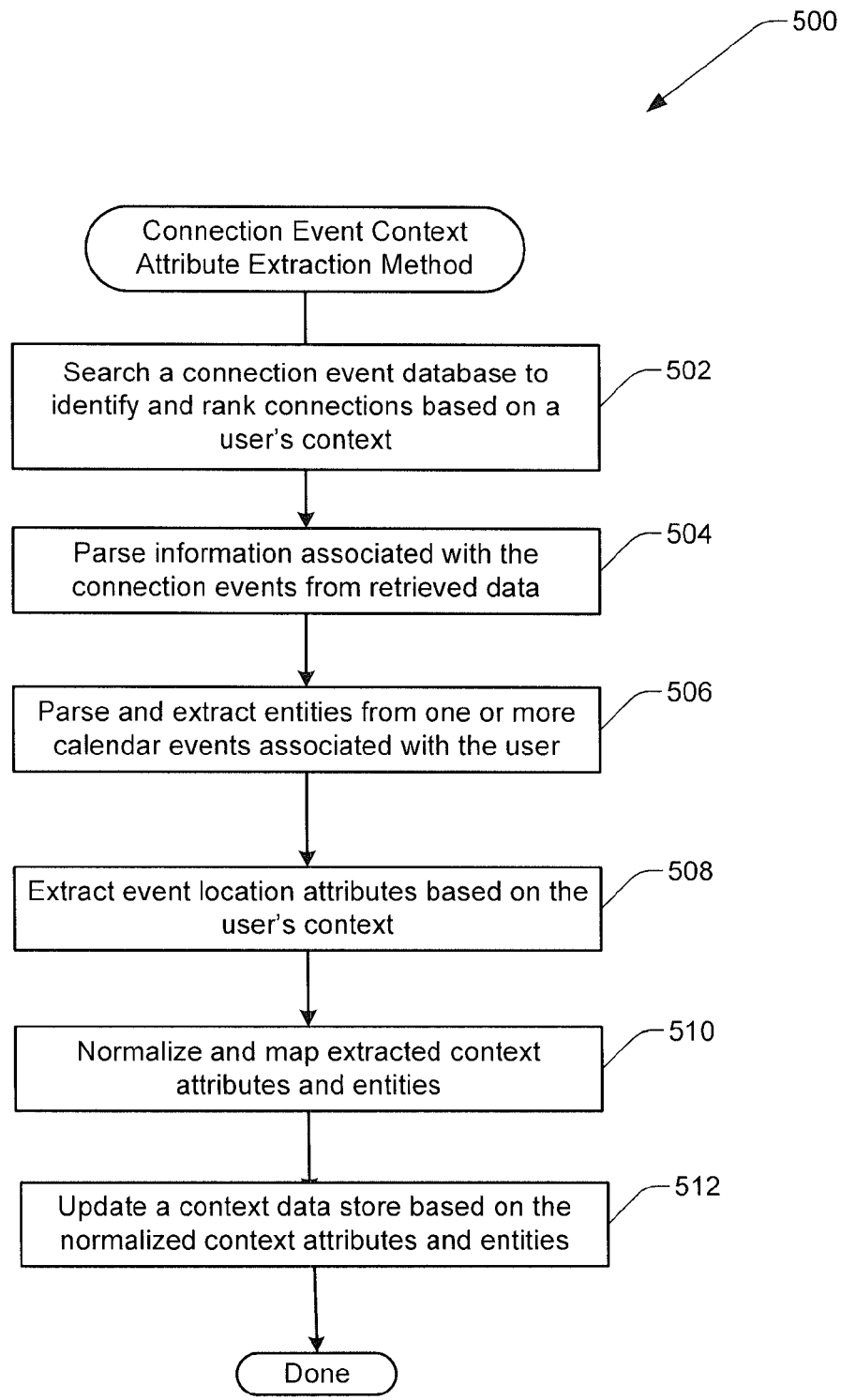
FIG. 5 shows a flowchart of an example of a method of extracting context attributes from connection event data, performed in accordance with some implementations.

FIG. 5 shows a flowchart of an example of a method of extracting context attributes from connection event data, performed in accordance with some implementations. A detailed description of examples of identifying connection events is discussed in commonly owned, co-pending U.S. patent application Ser. No. 13/743,895 entitled SYSTEMS AND METHODS FOR MAPPING RELEVANT PERSONAL CONNECTIONS, by Parker Harris et al., filed Jan. 17, 2013, which is incorporated herein by reference. Connection event context attribute extraction method 500 may extract context attribute data relating to physical interactions between a user and one or more other entities. The extracted context attributes may be stored in a context data store and may be used to provide context to one or more other modes of communication associated with the user, such as an instant messaging service. Furthermore, the extracted context attributes may be used to provide context to one or more social networks or collaborative environments by incorporating the extracted information into information feeds and using the extracted information to modify a presentation of the information feeds.

Accordingly, at step 502, a connection event database may be searched to identify and rank physical connections based on a user's context. As previously discussed, physical interactions between one or more entities, such as a salesperson and a customer, may be inferred based on various indicators, such as a physical proximity and an amount of time spent within that physical proximity. Once determined, the physical interactions, and metadata associated with the physical interactions, may be stored in a connection event database. Thus, the connection event database may store connection information that identifies and describes connections between various entities and a user. The connection event database may be searched to identify connection events that may be relevant to or provide information regarding a user's current context. Thus, the connection event database may be searched based on one or more already identified context attributes to identify and retrieve additional context attributes associated with connection event data. Moreover, a ranked list of connection event data may be generated by scoring and ranking the returned connection event data based on the already determined context attributes that form the basis of the query.

For example, a context attribute interface may search the connection event database to identify connection events that may be relevant to a user's current context. In this example, a user, such as a salesperson, may be engaged in an instant message-based conversation with a customer. The context attribute interface may have parsed context attributes from the message thread, such as an identity of the salesperson, an identity of the customer, and a topic of the conversation. In this example, the conversation may be about technical support or follow up support for a particular product that the salesperson sold to the customer. The context attribute interface may query the connection event database based on identifiers associated with the salesperson, customer, and product. The query may return two connection events in which the salesperson traveled to the customer's location. A first connection event may have been generated when the salesperson went to the customer to provide the product to the customer. For example, the salesperson may have installed and configured a software package for the customer. The second connection event may have been generated based on a follow up visit to update the software package. Both connection events and their associated data may be retrieved. Furthermore, they may be scored and ranked. For example, the second connection event may be ranked higher because it occurred more recently, or because the current message thread is related to the most recent version of the software, which was installed during the follow up visit that generated the second connection event.

At step 504, information associated with the connection events may be parsed to identify and extract entities relevant to the connection events. Thus, a parsing engine may be used to search the information retrieved from the connection event database, identify identifiers associated with entities mentioned in or associated with the connection events, and extract the identifiers associated with the relevant entities. For example, the connection event database may store connection events in a particular data structure that may include one or more data fields configured to store one or more types of data. Thus, the data structure may include a data field configured to store a unique identifier associated with an entity that generated the connection event, such as the salesperson. The data structure may further include a data field configured to store a unique identifier associated with an entity that was interacted with, such as the customer. Upon identifying a connection event as relevant to a user's context, the parsing engine may extract the unique identifiers from the data fields. Other context attributes may be parsed and extracted as well, the product at issue, and a company associated with the customer. It will be appreciated that the process of extraction may include copying the extracted information from the information that was retrieved from a query into a separate data structure dedicated to storing a particular type of data or information.

At step 506, entities may be parsed and extracted from one or more calendar events associated with a user. As set forth above, calendar events may be determined based on scheduled physical interactions stored in a user's calendar. Thus, a context interface application may access an application program that manages the user's calendar and may query the calendar for scheduled events. In some implementations, the context interface application and the calendar application may be linked to the same user account such that the context interface application may automatically access the user's calendar and extract calendar events. Alternatively, the context interface application and the calendar application may be linked to separate accounts, and the user may be prompted to provide access to the calendar application. Once provided access, the context interface application may query a data store that stores the calendar events. As similarly set forth above, context attributes extracted from the conversation thread may be used to identify, score, and rank calendar events and context attributes included in the calendar events. Thus, a meeting or appointment that a salesperson has scheduled with a customer that the salesperson is currently conversing with may be identified, retrieved, and scored and ranked as highly relevant.

At step 508, event location related context attributes may be extracted based on a user's context. Thus, the context application interface may analyze the retrieved information to extract locations and location attributes associated with the connection information. As similarly discussed above, the connection information may be stored in a particular data structure that includes data fields dedicated to storing particular types of data. Thus, the data structures may include data fields dedicated to storing a geographical, physical, or temporal location associated with the connection event. For example, if a physical connection was recorded for an on-site visit in which a salesperson visited a customer at his or her workplace, the location of the workplace, such as a business address, may be stored as a location attribute in the data structure that stores the connection event. Such location attributes may be extracted and stored in a separate data structure.

At step 510, the extracted context attributes and entities may be normalized and mapped to a format or data structure that may be stored in a context data store. Thus, mapping and normalizing the extracted context attributes may convert the context attributes from multiple different formats used by multiple heterogeneous sources into a single uniform format used by the context data store. Moreover, one or more context attributes may be associated with or inferred based on other context attributes. In some implementations, context attributes, such as products and services not explicitly included in connection event data, may be inferred based on a relationship between an interaction event and its location. For example, CRM sales records could contain one or more attributes, such as GEO location attributes associated with a product deployed at customer sites. These location attributes could be correlated with locations logged in physical interaction events. Thus, a location associated with a physical interaction event may be used to identify a CRM record, such as a sales record, that shares the same location. The sales record may include context attributes such as products and services associated with the sale. The products and services context attributes may be retrieved and associated with the physical interaction events. The association of the products or services with the physical interaction event may be verified by gathering information from a salesperson as part of a routine sales business process or physical interaction event logging process. In some implementations, the context data store stores context attributes in a data structure having data fields dedicated to storing particular types of context attributes. For example, the data structure may have data fields configured to store an identifier for a first entity, an identifier for a second entity, and a location attribute. As set forth above, the process of extraction may involve identifying one or more data values in information that resulted from a query, and copying and storing the identified data values into an intermediary data structure. The data values stored in the intermediary data structures may be mapped to data structures that have the same structure as data stored in the context data store.

For example, context attributes may be retrieved from a connection events database, which may include data pertaining to physical connections that result from a salesperson visiting different customers at the customers' respective places of business. Each of the customers may be a part of a large organization and may have associated context attributes, such as products and services that the customers have purchased or subscribed to. The products and services for different customers may be stored in the connection events database according to different formats depending on a region or company division. For example, a first geographical region or division may store information about products and services according to a first format, while a second geographical region or division may store information about products and services according to a second format. The information about the products and services may be parsed and extracted from connection events stored in the connection events database. The extracted information may be arranged and mapped to the same format.

In another example, an identifier for a first entity, such as a salesperson, an identifier for a second entity, such as a customer, and a location attribute may be retrieved from a first intermediary data structure generated when information was extracted from connection events associated with the salesperson. A second location attribute may be retrieved from a second intermediary data structure that was generated when information was extracted from calendar events associated with the salesperson. The retrieved information may be combined and arranged into a data structure that matches a structure of information used by the context data store to store context attributes associated with the salesperson.

In some implementations, the extracted context attributes may be normalized by expanding or transforming one or more data values included in the extracted context attributes. Thus, abbreviations or identifiers specific to the source of the context attribute may be replaced with general representations used by the context store. For example, the acronym "LB" may be replaced with the text "Load Balancer." Additionally, identifiers associated with users or entities may be replaced with the names or user names of the users or entities.

At step 512, a context data store may be updated based on the normalized information. Thus, once the context attributes have been extracted from the relevant connection events and calendar events and have been normalized, the normalized data may be stored in the context data store. Once stored in the context data store, the normalized data may be used by the context attribute interface. Thus, context attributes retrieved from physical connections and calendar connections between a user and another entity may be used to modify a presentation of a mode of communication used by the user, such as an instant message conversation or a video conference. Moreover, the context attributes retrieved from physical connections and calendar connections may be used to update or modify one or more information feeds in a social network or collaborative environment.

Figure 6:
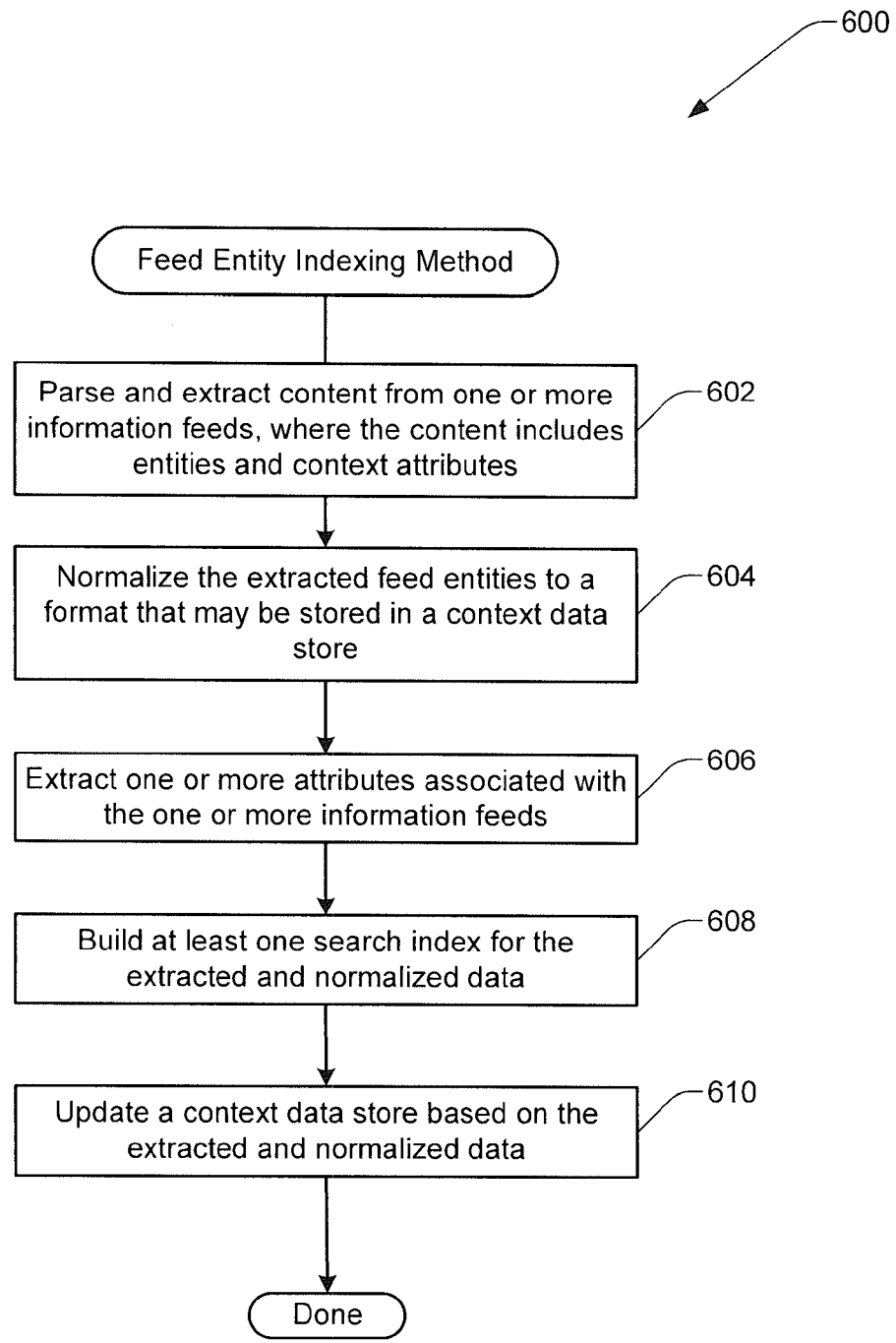
FIG. 6 shows a flowchart of an example of a method of extracting context attributes from one or more information feeds, performed in accordance with some implementations.

FIG. 6 shows a flowchart of an example of a method of extracting context attributes from one or more information feeds, performed in accordance with some implementations. As discussed above, information feeds may include feed posts and other content generated by one or more entities associated with an online social network or collaborative environment. For example, an information feed may include various posts and updates related to a case that a group of users are working on. In some implementations, a feed entity indexer may extract information from various information feeds to build one or more indexes for information stored in the information feeds. Furthermore, the extracted information may be used to update information stored in a context data store.

Accordingly, at step 602, content may be parsed and extracted from one or more information feeds. In some implementations, a system component, such as a feed entity indexer, routinely indexes information feeds as part of a background process. The feed entity indexer may also index feeds in response to a request issued by a context attribute interface. Thus, indexing of information feeds may occur automatically and periodically, or in response to a request which may be triggered by a user action or communication. The data associated with an information feed may be stored in one or more data tables as part of a multi-tenant database system. Thus, the data tables that store the information feeds may be accessible to and modified by multiple users of an online social network or a collaborative environment, such as Chatter® provided by Salesforce.com®.

The feed entity indexer may query information feeds to identify and retrieve feed items, such as feed posts, made within each information feed. For example, a feed post may be made by a worker who has closed a case. In this example, the feed may be an entity feed that has been created for the case, and the feed post may be a data object that indicates that the worker changed a status of the case from "open" to "closed". The feed entity indexer may retrieve a feed item and parse and extract context attributes associated with one or more entities from the content of the feed item. Thus, the feed entity indexer may parse the contents of a feed post, and extract any data values that identify one or more entities. Such data values may be unique object identifiers that identify a user that made the post, or a user that was mentioned in the post. Returning to the previous example, the feed post may be parsed and an identifier that identifies the user that closed the case may be extracted. It will be appreciated that other types of information may be parsed and extracted as well, such as mentions of users within the body of a post as well as mentions of products and services.

At step 604, the extracted information may be normalized and mapped to a format or data structure that may be stored in a context data store. As similarly discussed above with reference to FIG. 5, step 510, mapping and normalizing the extracted context attributes may convert the context attributes from multiple different formats used by multiple heterogeneous sources into a single uniform format used by the context data store. In some implementations, context attributes included in an information feed, or feed posts within an information feed, may include information or data values that are industry domain or region specific. For example, different regions may use different practices for recording time and date information. Accordingly, time and date information may be extracted, arranged, and stored in a single uniform format used by the context data store. Thus, context attributes may be extracted from information feeds and information feed posts, and mapped to a format used by the context data store. Moreover, abbreviations, identifiers, and expressions may be normalized. For example, the acronym "CPU" may be expanded or transformed into the text "Central Processing Unit."

At step 606, attributes of one or more information feeds may be parsed, extracted, and normalized. Thus, in addition to parsing and extracting information for feed items within a feed, general attributes associated with the information feeds themselves may be parsed, extracted, and normalized. General attributes may be a feed topic or "Gist" of an information feed. For example, a "Gist" of an information feed may be a text string including a brief summary of the contents of the information feed that may be generated automatically or by a user. A feed topic may be a few words identifying a topic for the information feed, such as a case reference number for the case or record for which the information feed has been generated. The general attributes may also include metadata associated with the information feed, such as timestamp data, social network groups associated with the information feed, and users associated with the information feed. As similarly discussed with reference to step 602 and step 604, the attributes may be parsed from the information feeds, extracted to an intermediary data structure, and normalized to a data structure that is compatible with the data stored in the context data store.

At step 608, a search index may be built for the extracted and normalized information. Thus, the extracted information may be stored in a centralized location, such as a feed search index store. An index may be generated for each type of information which may be a content based index, a metadata based index, or a combination of both. The indexed data stored in the feed search index store may be accessible by a context attribute interface application. Thus, the context attribute interface application may access the feed search index store and use the generated indexes to perform one or more queries of the feed search index store to identify and retrieve context attributes. For example, if a context attribute interface application is aggregating context attributes which will be used to modify a presentation of a mode of communication or a presentation of an information feed, the context attribute interface application may query the feed search index store to identify and retrieve context attributes that may provide a basis of the modification.

At step 610, a context data store may be updated based on the normalized and extracted information. Thus, once the context attributes have been extracted from the relevant information feeds and have been normalized and indexed, a context attribute interface application may retrieve context attributes relevant to a user's current context and store the relevant context attributes in a context data store. Once stored in the context data store, the normalized data may be used by the context attribute interface. Thus, context attributes retrieved from information feeds may be stored and used to modify a presentation of a mode of communication when relevant to a user's current context, such as an instant messaging conversation thread or a video conference that the user is currently conducting. Moreover, the context attributes retrieved from the information feeds may be used to update other information feeds or modify presentations of one or more information feeds for a specific user or group of users' context, as discussed in greater detail in FIG. 8.

Figure 7:
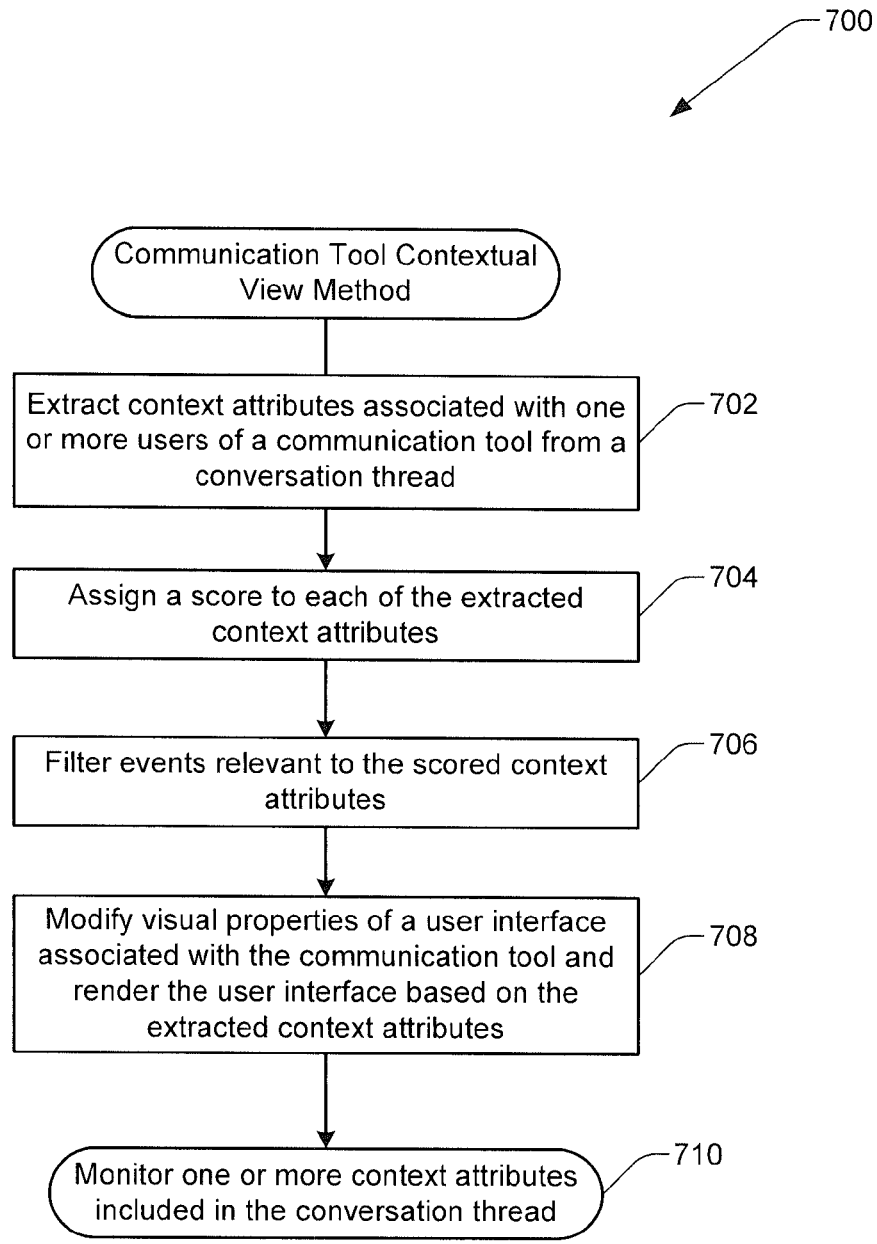
FIG. 7 shows a flowchart of an example of a method of generating a presentation of a mode of communication based on context attributes, performed in accordance with some implementations.

FIG. 7 shows a flowchart of an example of a method of generating a presentation of a mode of communication based on context attributes, performed in accordance with some implementations. As set forth above, a mode of communication may be an implementation of a communication tool, such as an instant messaging service. For example, the communication tool may be the instant messaging service Chatter® Instant Messenger provided by Salesforce.com®. The presentation of the mode of communication or communication tool may refer to various functionalities and widgets included in a user interface screen, as well as a visualization or presentation of the user interface screen. Thus, context attributes may be used to modify functionalities presented to a user as part of the communication tool, and may be further used to modify aesthetic attributes of the communication tool, such as fonts of text, colors, and other formatting attributes.

Accordingly, at step 702, context attributes may be extracted for one or more users of a communication tool. The context attributes may be extracted from a conversation thread in a particular mode of communication. For example, several users may be using a communication tool to engage in an instant message conversation. During the conversation, text may be generated by the users who are conversing and stored as part of a chat history. A parsing engine may parse the stored text and extract one or more entities from the chat history. Thus, the parsing engine may perform a real-time analysis of the text stored in the chat history and extract entities as the conversation is taking place. For example, the parsing engine may compare text words in the chat history against a list of known entities that is maintained by the provider of the communication tool, which may be an on-demand service provider. If a word matches an entry in the list, it may be extracted and stored in an intermediate data structure. Thus, if a customer is a participant in an instant messaging conversation thread and mentions that he is having a problem with product XYZ, the parsing engine may analyze the text, determine that the term product XYZ matches an entry in a list of known entities, and extract product XYZ as a context attribute.

Furthermore, context attributes may be extracted from information stored in the context data store. Each of the users participating in the conversation may have a unique identifier associated with the user's account that may be used to identify the user and retrieve information associated with the user. The identifier may be checked against data stored in a context data store to identify and retrieve context attributes associated with the user. Thus, any context attribute stored in a data structure or data object that is associated with an identifier that matches the user's identifier may be identified and retrieved. For example, a feed topic may have been stored in the context data store because a user authored a post in the information feed corresponding to the feed topic. The feed topic may be stored in a data object that includes the user's identifier to indicate that the user authored the post. The user's identifier may be matched with the identifier stored in the data object, and the feed topic may be identified as a context attribute that is relevant to the user. Accordingly, the feed topic may be extracted and stored in an intermediary data structure.

In this way, context attributes associated with all users involved in an instant message conversation may be aggregated in real-time while the conversation is happening. It will be appreciated that this may be performed for any mode of communication or combination of modes of communication. For example, context attributes may be extracted for users involved in a communications session involving video conferencing, or a combination of video conferencing and content sharing via instant message chat.

At step 704, the extracted context attributes may be scored to determine an order that may be used when the context attributes are subsequently rendered as part of a user interface screen. Scoring the context attributes may include assigning a weight to each of the extracted context attributes that determines an order of importance or relevance among the context attributes. For example, a context attribute with a higher score may be ranked higher than a context attribute with a lower score. The context attributes may be scored and ranked based on the content of the conversation. For example, if a context attribute, such as a product name, was mentioned by one of the users during the conversation, the context attribute may be scored and ranked highly. The context attributes may also be scored and ranked based on a strength of a relationship with a user participating in the conversation. For example, if a user participating in the conversation is also the author of a feed post that was retrieved as a context attribute, that feed post may be scored and ranked highly. It will be appreciated that the scoring and ranking process may use combinations of several factors to score and rank context attributes. For example, a company associated with a physical connection may be scored highly if it was mentioned in the conversation thread and was created recently, as determined by its associated metadata.

At step 706, the scored context attributes may be filtered based on one or more characteristics of a client device. In some implementations, characteristics of a client device may refer to a device form factor, capability of a device interface, applications installed on the client device, or resources available to the device. The characteristics of the client device may be used to filter the scored context attributes to ensure that only context attributes that are compatible with the client device are subsequently rendered and sent to the device. For example, the client device may be a mobile device used by a user. The scored context attributes may include data objects such as images of maps generated based on locations, or images generated based on other context attributes. The scored context attributes may also include files of different formats, such as video files, and links to other data objects or applications. Some of these types of context attributes might not be compatible with the mobile device. This may be because the mobile device might not have access to sufficient hardware or software resources to properly display or provide functionality for a context attribute. For example, a context attribute may include a link to a resource, such as a video, or an on-demand application. The mobile device might not have the appropriate application or plug-in to play the video. The mobile device might also not have a form factor or device interface capable of executing the on-demand application.

In some implementations, a context attribute interface may determine which scored context attributes are not compatible with the mobile device. For example, the context attribute interface may compare information associated with a scored context attribute with a predetermined list of capabilities of the mobile device. The predetermined list of capabilities may be generated based on information stored in a user's profile, which may indicate which applications have been installed on the user's mobile device. The context attribute interface may determine which applications a scored context attribute requires based on information, such as metadata, associated with the scored context attribute. The metadata may be information such as a file name or extension. If the required application is not installed on the mobile device, the context attribute interface may determine that the scored context attribute is not compatible with the mobile device. The context attribute interface may perform one or more operations based on its determination of whether or not a scored context attribute is compatible with the mobile device. For example, the context attribute interface may remove the incompatible context attributes from the context data store, disable them prior to sending them to the mobile device, or store them in a separate data object in the context data store.

At step 708, visual properties of a user interface may be modified and the user interface may be rendered based on the scored context attributes. As set forth above, the user interface may include several user interface components that provide a user with various functionalities that may be used to communicate with other users. For example, the user interface components may enable a user to share text, images, files, and other content with other users that are participating in a conversation. The presentation of the user interface components in the user interface screen may be modified based on the scored context attributes. Modifying the user interface in this way provides the user with a user interface that has been customized based on the user's current context. For example, context attributes associated with a recent service call or a product that was recently sold may be featured more prominently than older context attributes not mentioned in the conversation. Moreover, context attributes that are to be displayed in the user interface screen may be selected based on their score. For example, a user interface component may only display the five context attributes with the highest scores.

In addition to modifying which context attributes are presented in the user interface screen and how prominently they are presented, the way in which user interface components are rendered may also be modified. Thus, aesthetic attributes of the user interface screen, or user interface components included in the user interface screen, may be modified based on context attributes. For example, a font or color of text included in the user interface components may be modified based on the context attributes. In this example, if a product name is mentioned in a conversation thread, the product name may be identified as a highly relevant context attribute, and may be rendered as bold and italicized font. Furthermore, source contextual attributes and links to other information or content may be included in the user interface screen and rendered. Thus, in addition to bolding and italicizing the product name, an embedded link may be rendered that provides a link to another data object, such as a knowledge database. The link may be displayed in a variety of ways, such as a pop-up or mouseover that provides a user with an active link or pop-up window when the user focuses on the product name in the user interface screen. In another example, a context attribute may indicate that a user is using a mobile version of a communication tool that executes on a mobile communications device, such as a Smartphone. Thus, the user interface components included in the user interface screen may be rendered in a format that is compatible with the display of the mobile communications device.

In some implementations, the user interface screen may be modified to include a data field that may be used to annotate a conversation thread with contextual information. Thus, a data field may be presented within the user interface screen that presents the most relevant scored and ranked context attributes. The data field may be configured to receive an input from a user that causes the communication tool to annotate the conversation thread with one or more selected context attributes. Thus, a user may select one of the presented context attributes and associate the selected context attribute with one or more words in the text of the conversation thread. In this way, the user may be provided with the ability to annotate a mode of communication with context attributes identified and retrieved from various different sources, such as a CRM database and an online social network. The annotations may be rendered as links or data objects that may be accessible to any users participating in the conversation and viewing the conversation thread. Furthermore, the links and annotated information may be retained if the conversation thread is subsequently stored, as set forth in FIG. 8.

It will be appreciated that the modification of rendering of a user interface may also be applied to forms and modes of communication other than text. For example, the presentation of a video conferencing tool may be modified based on scored context attributes. Furthermore, the incorporation and rendering of a video conferencing window within an instant messaging conversation thread may be modified based on scored context attributes.

Figure 9:
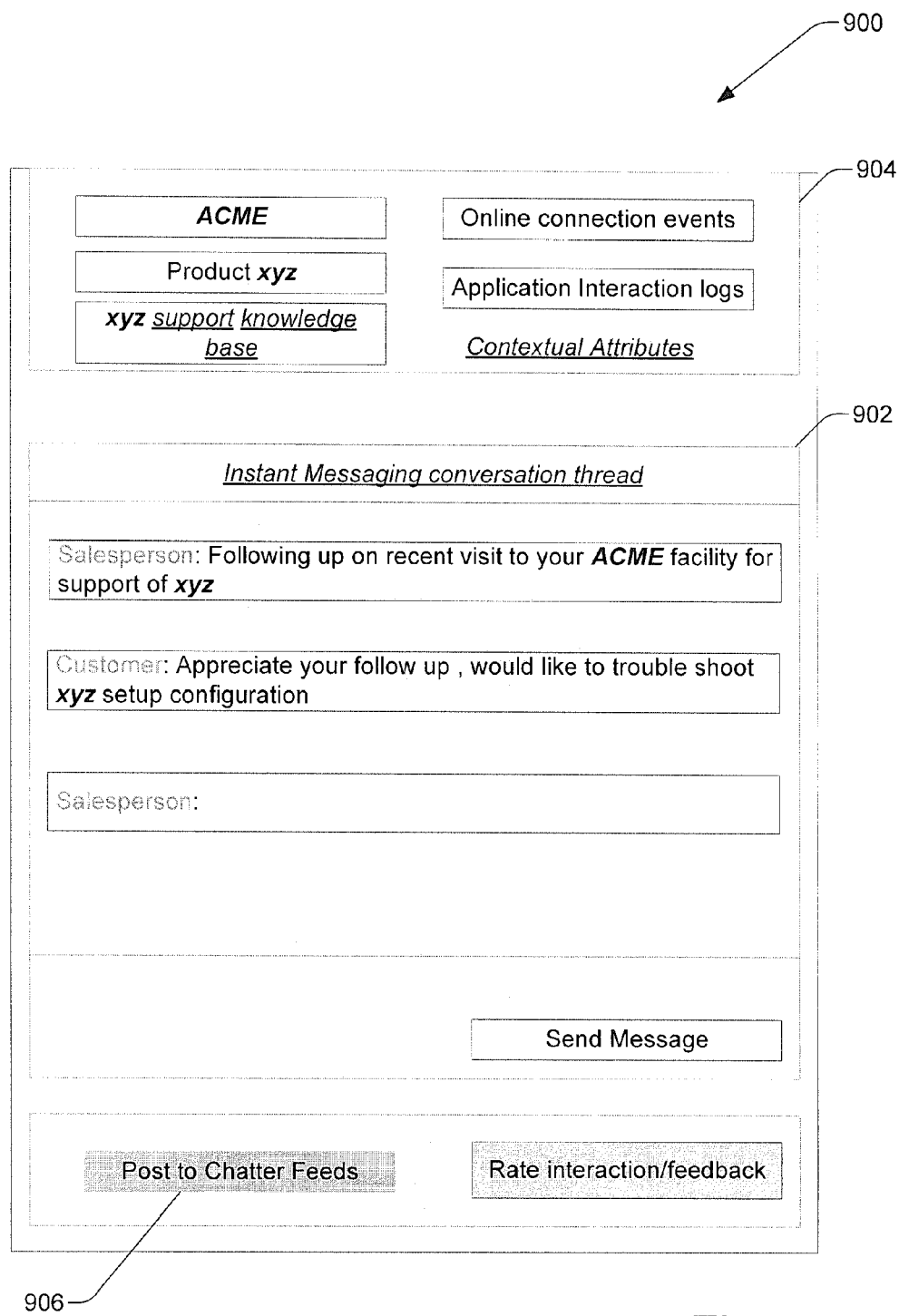
FIG. 9 illustrates an example of an image of a user interface screen that may be rendered based on scored context attributes, in accordance with some implementations.

FIG. 9 illustrates an example of an image of a user interface screen that may be rendered based on scored context attributes, in accordance with some implementations. User interface screen 900 may include data field 902 that displays a chat history for a current instant messaging conversation thread. In this instance, a salesperson is providing follow up support for a product XYZ after visiting the customer's facility. The chat history displays text shared by the salesperson and the customer during the current conversation thread. The text "ACME" and "xyz" have been identified as context attributes associated with a company ACME and a product xyz. Accordingly, the presentation of the text has been modified and rendered in bold italicized font.

User interface screen 900 may further include data field 904 which may be configured to display one or more context attributes that have been extracted, scored, and rendered based on the contents of the conversation thread shown in data field 902. Data field 904 may be configured to provide links to additional data objects, or be configured to tag text included in the conversation thread. Because the product xyz and the company Acme were mentioned in the conversation thread, context attributes associated with product xyz and the company Acme have been scored highly and are prominently featured in data field 904.

User interface screen 900 may also include data field 906 which may be configured to receive an input from a user that causes a system component, such as a context attribute interface, to post the contents of the conversation thread to one or more information feeds. As discussed in greater detail below in FIG. 8, the contents of the conversation thread may be incorporated into one or more information feeds, or posts within the information feeds. The contents of the conversation thread may also be used to modify a presentation of the information feeds.

Returning to FIG. 7, at step 710, the content of one or more conversation threads may be monitored to detect changes in context attributes. Thus, one or more system components, such as a context attribute interface, may monitor the conversation thread in real time to determine if additional context attributes are mentioned, or if the scoring of the context attributes should be changed. In response to detecting a change, the scoring and presentation of the context attributes may be updated in real-time. For example, if a customer and a salesperson begin discussing a new product ABC, context attributes associated with product ABC may be extracted, scored, and rendered as part of a user interface screen.

Figure 10:
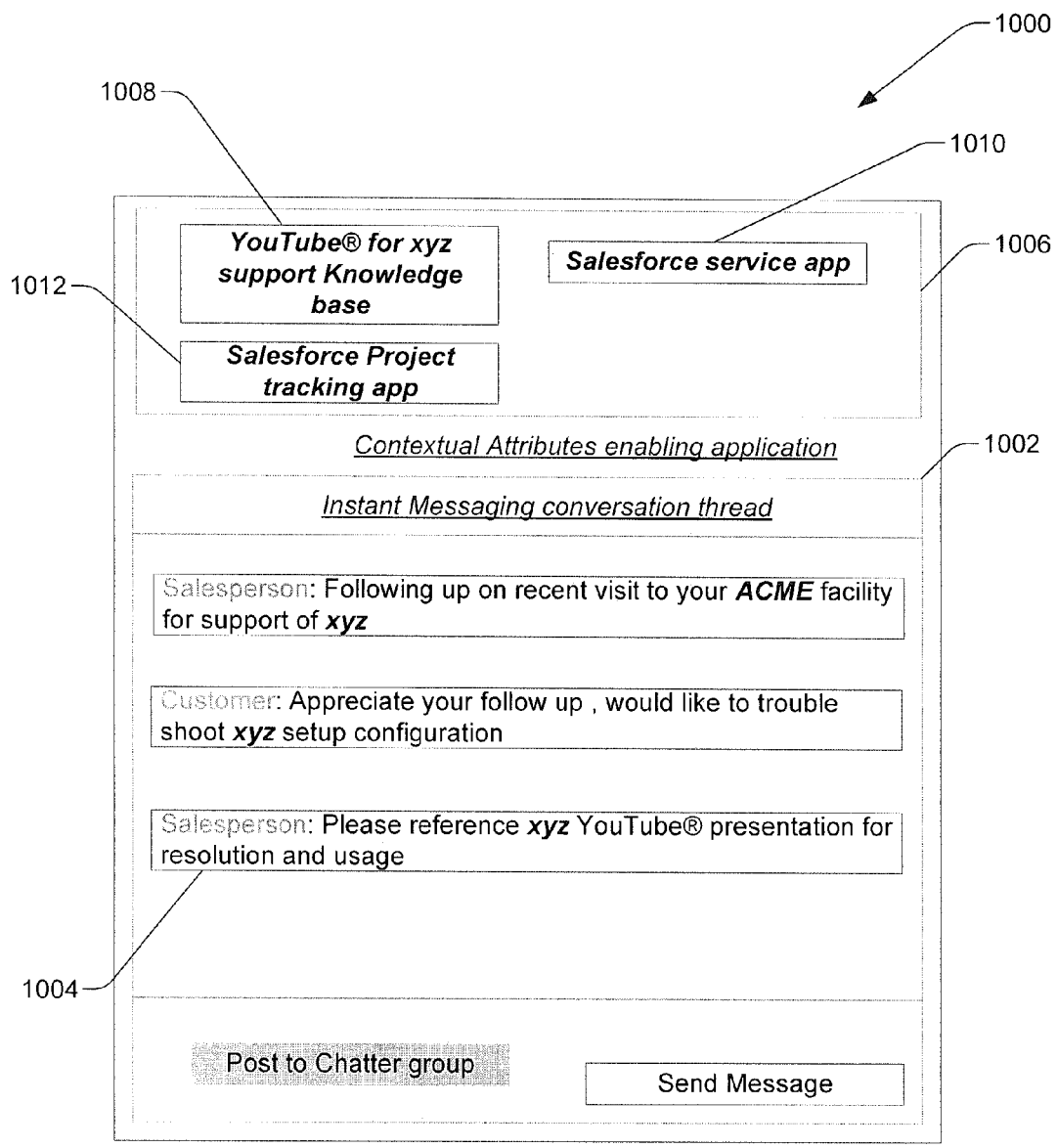
FIG. 10 illustrates another example of an image of a user interface screen that may be rendered based on scored context attributes, in accordance with some implementations.

FIG. 10 illustrates another example of an image of a user interface screen that may be rendered based on scored context attributes, in accordance with some implementations. User interface screen 1000 may provide a customer or user with a presentation of a communication tool, such as an instant messaging service. The presentation may be modified, updated, and rendered based on the user's context. In some implementations, the user's context may include a position, role, or title within an organization. Thus, the same instant messaging conversation thread may be rendered differently for different users based on their respective professional roles. For example, in contrast to user interface screen 900 which is specific to the salesperson's context, user interface screen 1000 may display a different presentation of the same instant messaging thread that is specific to the customer's context. Accordingly, a context attribute interface may generate and render various different presentations of a user interface screen for a particular instant messaging thread for various different users associated with the instant messaging thread. Each presentation may be specific to an entity, such as a user or a group of users.

Accordingly, user interface screen 1000 may include data field 1002 that displays a chat history for a current instant messaging conversation thread. As set forth above with reference to FIG. 9, data field 902, the conversation thread may be between a salesperson and a customer regarding support for a product or service that the customer has purchased. For example, a salesperson may be providing additional product support for product xyz to the customer after the salesperson recently visited the customer's organization, ACME. Data field 1002 may include data field 1004, in which the salesperson has replied to the customer's request for information and mentioned a resource, such as a YouTube® video that includes a presentation about product xyz.

User interface screen 1000 may further include data field 1006 which may be configured to display one or more context attributes that have been extracted, scored, and rendered based on the contents of the conversation thread shown in data field 1002. For example, data field 1006 may include context attribute 1008 which has been presented in response to the salesperson mentioning an online video resource associated with the product the customer needs help with. As previously discussed, the customer has asked for support for product xyz. In response to the customer's inquiry, the salesperson has recommended that the customer view a YouTube® presentation referenced in an online resource, such as a Knowledge base provided by Salesforce.com®. The text entered by the salesperson may be parsed and analyzed in real time. Entities may be extracted from the text. For example, the product name xyz may be extracted. Based on the extracted entity name, a context attribute interface may determine that a Knowledge base article exists for product xyz. In some implementations, this may be accomplished by querying a context data store for context attributes associated with product xyz. The context data store may store an indicator that indicates that a Knowledge base article exists for product xyz, and provides a pointer, link, or uniform resource locator (URL) to the Knowledge base article. One or more data values may be retrieved from the context data store, and rendered and displayed in data field 1008. For example, data field 1008 may display text indicating that a Knowledge base article exists for product xyz, and that the Knowledge base article includes a YouTube® presentation associated with product xyz. Furthermore, data field 1008 may provide an interactive link to the Knowledge base article. Data field 1008 may be generated, rendered, and displayed in real-time and while the conversation is taking place.

Other context attributes may also be included in data field 1006. For example, data field 1006 may include context attributes which enable application services or provide links to applications or services that the customer subscribes to. In some implementations, a customer may subscribe to one or more database services provided by an on-demand service provider, such as Salesforce.com®. The products or services may be one or more applications, such as enterprise applications.

For example, the on-demand service provider may provide the customer with a data or content management system that may be used with a CRM database. The product or service may also be an application that is part of a collaborative online environment. The application may track an entity, such as a project that the customer is working on or following. Products and services, such as applications, may be identified based on entities extracted from the conversation thread. For example, a context attribute interface may extract the product name "xyz" and the customer's name or ID. The context attribute interface may query the context data store to determine what related services and products the customer subscribes to or has purchased. The context attribute interface may render and display data objects associated with any services and products that are identified as relevant to product xyz.

Accordingly, data field 1006 may include context attribute 1010 and context attribute 1012. Context attribute 1010 may provide a link to an application that the customer uses to track a project in which product xyz is being used. Context attribute 1012 may provide a link to a service application that the customer uses to manage content associated with product xyz, such as the Service Cloud Console provided by Salesforce.com®. For example, the customer may use the Service Cloud Console to manage information about product xyz in a CRM database. Thus, in response to an entity, such as product xyz, being mentioned in a conversation thread, context attributes may be dynamically rendered and presented in a user interface, and provide the user with user interface components that include interactive links. The user may select the links to access one or more other applications.

Figure 8:
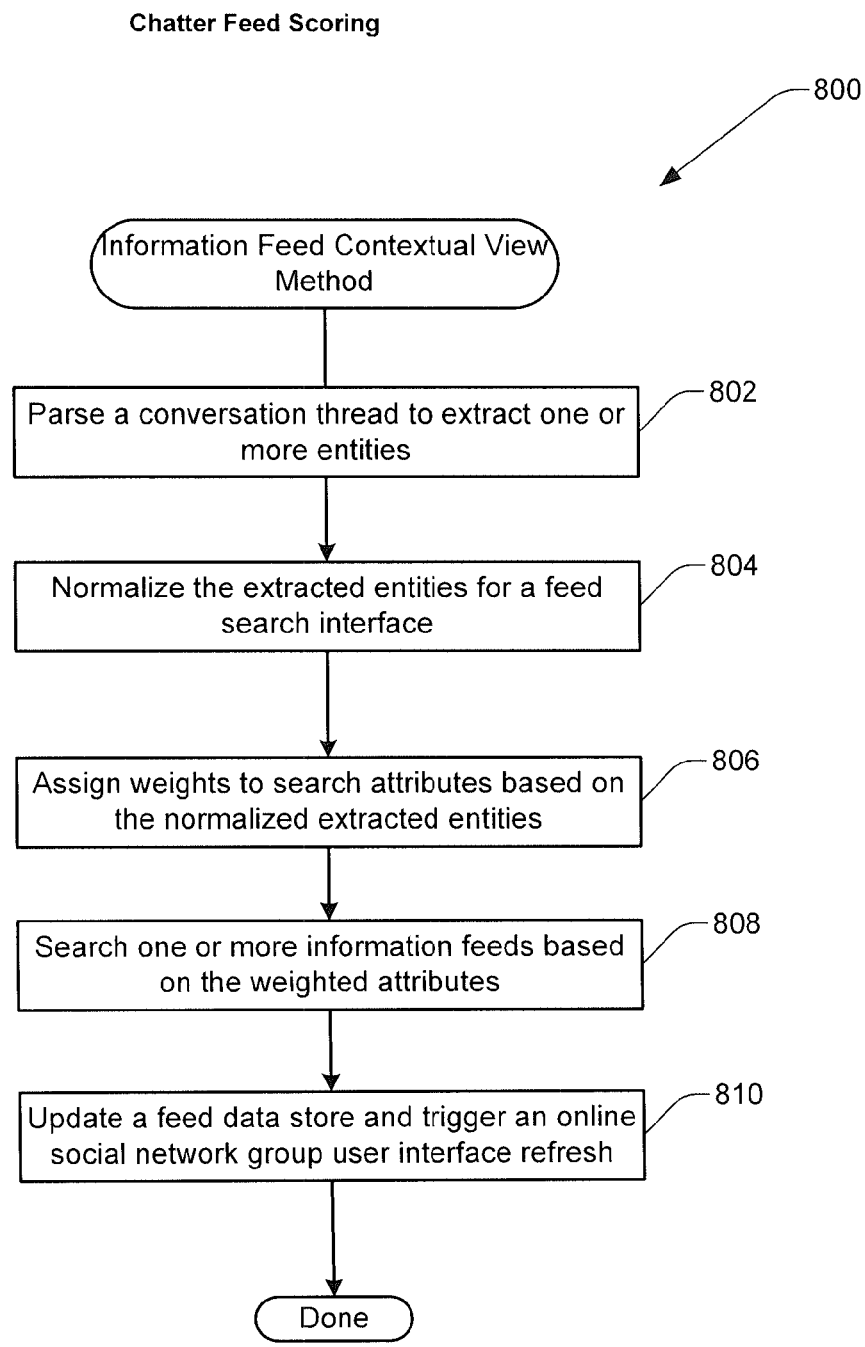
FIG. 8 shows a flowchart of an example of a method of updating one or more information feeds based on at least one conversation in a communication tool, performed in accordance with some implementations.

FIG. 8 shows a flowchart of an example of a method of updating one or more information feeds based on at least one conversation in a communication tool, performed in accordance with some implementations. Thus, information, such as context attributes, may be parsed and extracted from one or more conversations that take place within the context of a communication tool, such as the instant messaging service Chatter® instant messenger. The extracted information may be used to update one or more information feeds in an online social network, such as Chatter®. Furthermore, the extracted information may be used to update a presentation of a group within the social network.

Accordingly, at step 802 a conversation thread may be parsed to extract one or more entities form the conversation thread. As similarly discussed above with reference to FIG. 7, a parsing engine may search text included in a conversation thread and extract relevant information. For example, a context attribute interface may include a parsing engine that searches a chat history of a communication tool, parses the searched text, and extracts any identified entities into an intermediary data object. In one example, entities such as a user name, a product, a company, an account, or a location may be extracted if mentioned within the conversation thread.

At step 804, the extracted entities may be normalized for a feed search interface. Thus, the extracted entities may be converted from multiple different formats used by multiple heterogeneous sources into a single uniform format used by the context data store. For example, the names of entities may be stored in a format that is industry domain or region specific. The entity names may be mapped to a format used by the context data store. As similarly set forth above, abbreviations, identifiers, and expressions may be normalized.

At step 806, weighted search attributes may be generated based on the normalized extracted entities. In some implementations, a feed search interface may generate a query to be issued to a feed data store. The query may include several search terms that may be used to identify one or more relevant information feeds that may exist in an online social network or collaborative environment. The search terms may be the normalized extracted entities. Thus, entities that were mentioned in or participating in the conversation thread may be used as search attributes that form the basis of a query for relevant information feeds.

Furthermore, weights may be assigned to the search attributes to return the information feeds most relevant to the conversation thread. Weights may be assigned to search attributes, such as extracted entities, by using a static lookup table or a computer-generated metrics. For example, the system may monitor a number of occurrences in a conversation thread and generate a weight based on the number of occurrences. Thus, the computer-generated metric may be based on Chatter® group information feed content, Chatter® group header descriptions, associated information feed zones, or a proximity or collocation of multiple context attributes within a sentence boundary or conversation thread. Alternatively, as a post processing step, weight criteria could also be applied to rank search results prior to display to a user. The computation of weights may also be specific to a group of users in an online social network, such as Chatter®. For example, if a group is dedicated to a certain business process or topic, context attributes relevant to that business process or topic may have higher relevance. Extracted entities corresponding to those context attributes may be given higher weights. The specificity of the search term weight computation and assignment may be specific as well as generic depending on the targeted object. For example, the computation may be specific for a group of users of an online social network, such as a Chatter® group, or generic for a CRM data object, such as a case object accessible to many users using different enterprise applications.

At step 808, one or more information feeds may be searched based on the weighted search attributes. Accordingly, a feed data store may be searched using the previously generated query having the weighted search terms. Information feeds that include data values corresponding to the entities underlying the query may be identified and returned as results of the query. For example, if a user participating in the conversation thread has made posts in an information feed, subscribed to an information feed, or been mentioned in an information feed, that information feed may be identified based on a data value identifying the user that is stored either as content or metadata associated with the information feed. Similarly, information feeds associated with other entities, such as companies, contacts, accounts, and products may also be identified. The results may be prioritized or ordered based on the weights assigned to the search terms. The results of the search may include feed posts within information feeds, as well as the information feeds themselves.

In some implementations the results of the search may be presented to a user at a user interface. Thus, as discussed in greater detail below with reference to FIG. 10, the information feeds or feed posts that are most relevant to the conversation thread may be presented to a user. The user may make a selection of one or more information feeds that should be updated with information extracted from the conversation thread. The selected feeds may be updated in response to receiving the selection. Alternatively, the feeds may be updated automatically according to a predetermined set of rules.

Accordingly, at step 810, a feed data store may be updated and a user interface of a social network group may be refreshed. Thus, the stored data associated with the selected information feeds and feed posts may be updated to include information extracted from the conversation thread. In some implementations, the entire conversation thread and its associated metadata may be stored as a data object that is a child of the selected information feed or feed post. For example, if a salesperson and a customer are messaging each other via a communication tool about the salesperson's most recent onsite visit, information from the conversation may be used to identify a feed post made by the salesperson when he went to make the visit. The feed data store may be updated so that the conversation thread is stored along with the feed post. The feed post and the conversation thread may be stored in the same data object, or as separate data objects that are parent-child objects.

Furthermore, a user interface of a social network group may be refreshed. In some implementations, refreshing the user interface may cause the updated content to be rendered for a communication tool and an online social network. Thus, a user interface for an instant messaging service and an information feed in an online social network may be rendered in the same browser session. Once rendered, a user may be able to view and interact with the updated content. For example, a user of an instant messaging service may be able to navigate or view a feed post which was tagged in the instant message conversation. Alternatively, other users, such as members of a group in an online social network, may be viewing the information feed. Once the refresh has been triggered, the group of users may be able to view and access the instant message conversation thread. In some implementations, the rendering process may generate one or more filters that allow users to browse and filter information feeds based on information included in instant message conversation threads that have been tagged to or associated with the information feeds.

It will be appreciated that while FIG. 8 has been discussed with reference to updating data associated with an online social network, systems and methods disclosed herein may be used to update one or more other types of databases. Thus, instead of a feed data store, a CRM database, an enterprise application, or any other context attribute resource may be updated either alone or in combination.

Figure 11:
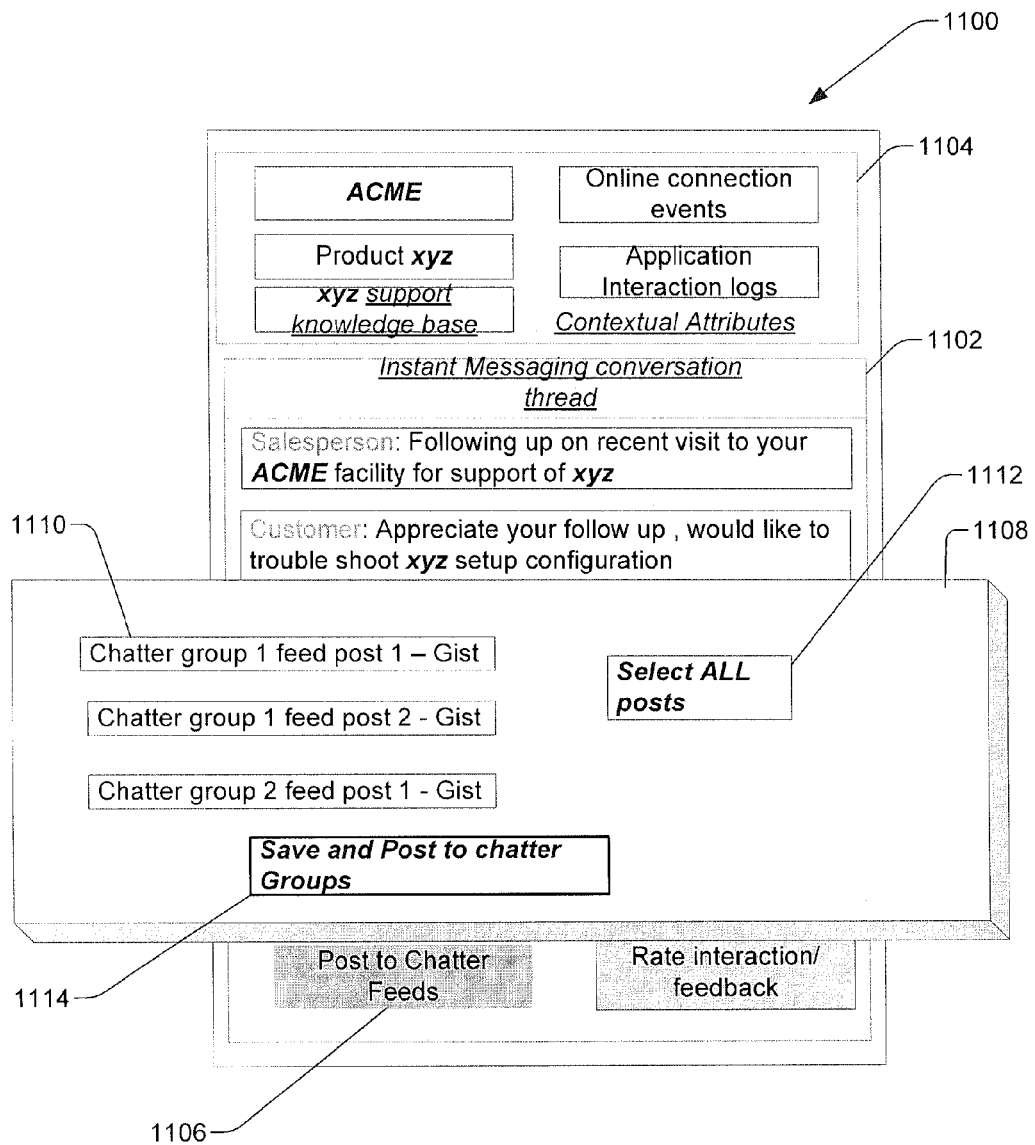
FIG. 11 illustrates an example of an image of a user interface screen that may be used to update information stored in information feeds of a social network based on information extracted from a communications tool, in accordance with some implementations.

FIG. 11 illustrates an example of an image of a user interface screen that may be used to update information stored in information feeds of a social network based on information extracted from a communications tool, in accordance with some implementations. User interface screen 1100 may include data field 1102 that displays a chat history for a current instant messaging conversation thread. User interface screen 1100 may further include data field 1104 which may be configured to display one or more context attributes that have been extracted, scored, and rendered based on the contents of the conversation thread shown in data field 1102.

User interface screen 1100 may also include data field 1106 which may be configured to receive an input from a user that causes a system component, such as a context attribute interface, to display a data field that enables the posting of the contents of the conversation thread to one or more information feeds in a social network. Accordingly, in response to receiving an input from a user, data field 1108 may be presented in user interface screen 1100.

Data field 1108 may include data field 1110 which may be configured to display the results of a query of a feed data store that was performed based on the contents of the conversation thread displayed in data field 1102. Data field 1110 displays three feed posts which have been identified based on the entities included in the conversation thread, such as the customer's ID, the salesperson's ID, product xyz, and company ACME. Thus, the posts may have been authored by either the customer or the salesperson, or might relate to product xyz or company ACME. Data field 1110 may display various information about each feed post, such as a social network group that the feed post belongs to, and a "Gist," or brief summary, associated with the feed post.

Data field 1108 may also include data field 1112 which may present the user with an option to select all presented information feeds or feed posts. Data field 1108 may further include data field 1114 which may be configured to update the selected information feeds or feed posts in response to receiving an input from the user. In this instance, if any of the three feed posts that are presented are selected, they will be updated with information from the conversation thread.

Figure 12:
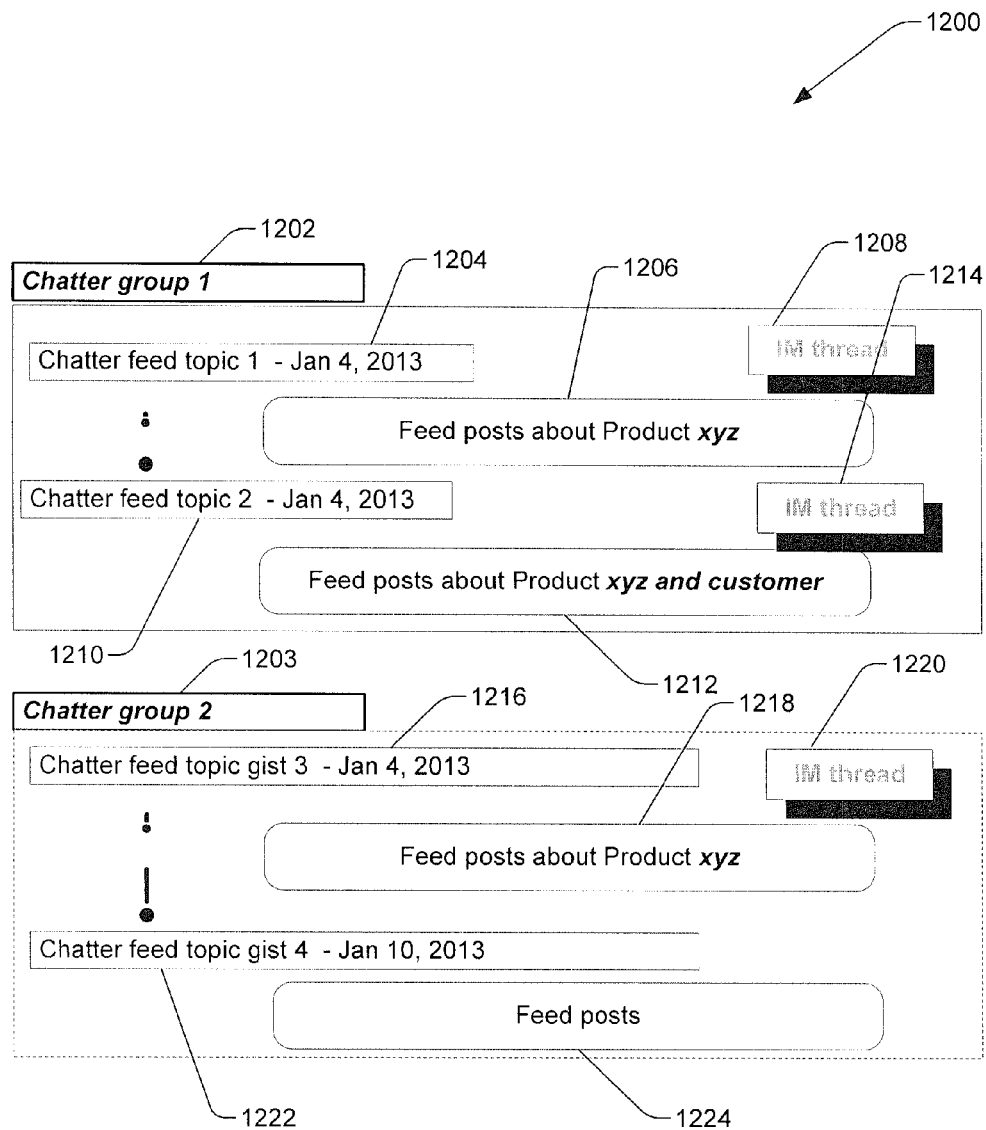
FIG. 12 illustrates an example of an image of feed posts that have been updated with information from a conversation thread, in accordance with some implementations.

FIG. 12 illustrates an example of an image of feed posts that have been updated with information from a conversation thread, in accordance with some implementations. As previously discussed, relevant feed posts made in a social network may be identified based on a conversation thread that takes place in a separate mode of communication, such as an instant messaging service. Image 1200 illustrates an example in which feed posts belonging to feed topics in two different social network groups have been identified based on entities that were mentioned in the conversation thread.

Image 1200 includes data field 1202 which displays updated feed information for a first social network group. Data field 1202 includes first feed topic 1204 and second feed topic 1210. First feed topic 1204 and second feed topic 1210 include feed posts 1206 and feed posts 1212 respectively. Both feed posts 1206 and feed posts 1212 include entities that match entities mentioned in the conversation thread. For example, feed posts 1206 include product xyz, while feed posts 1212 include product xyz and posts made by the customer. Thus, both first feed topic 1204 and second feed topic 1210 have been selected as relevant to the instant messaging conversation thread and have been updated to store data objects including the contents of the instant messaging conversation thread. Thus, data fields 1208 and 1214 have been generated and rendered, and provide links to the data objects.

Image 1200 includes data field 1203 which displays updated feed information for a second social network group. Data field 1203 includes third feed topic 1216 and fourth feed topic 1222. Third feed topic 1216 includes feed posts 1218 that mention product xyz. Thus, third feed topic 1216 has been identified as relevant to the conversation thread and selected to be updated. Accordingly, a data object has been created that stores the conversation thread and data field 1220 has been rendered to provide a link to the data object. Fourth feed topic 1222 includes feed posts 1224 which do not mention any of the relevant entities and has not been identified as relevant to the conversation thread. Accordingly, fourth feed topic 1222 has not been updated.

Figure 13:
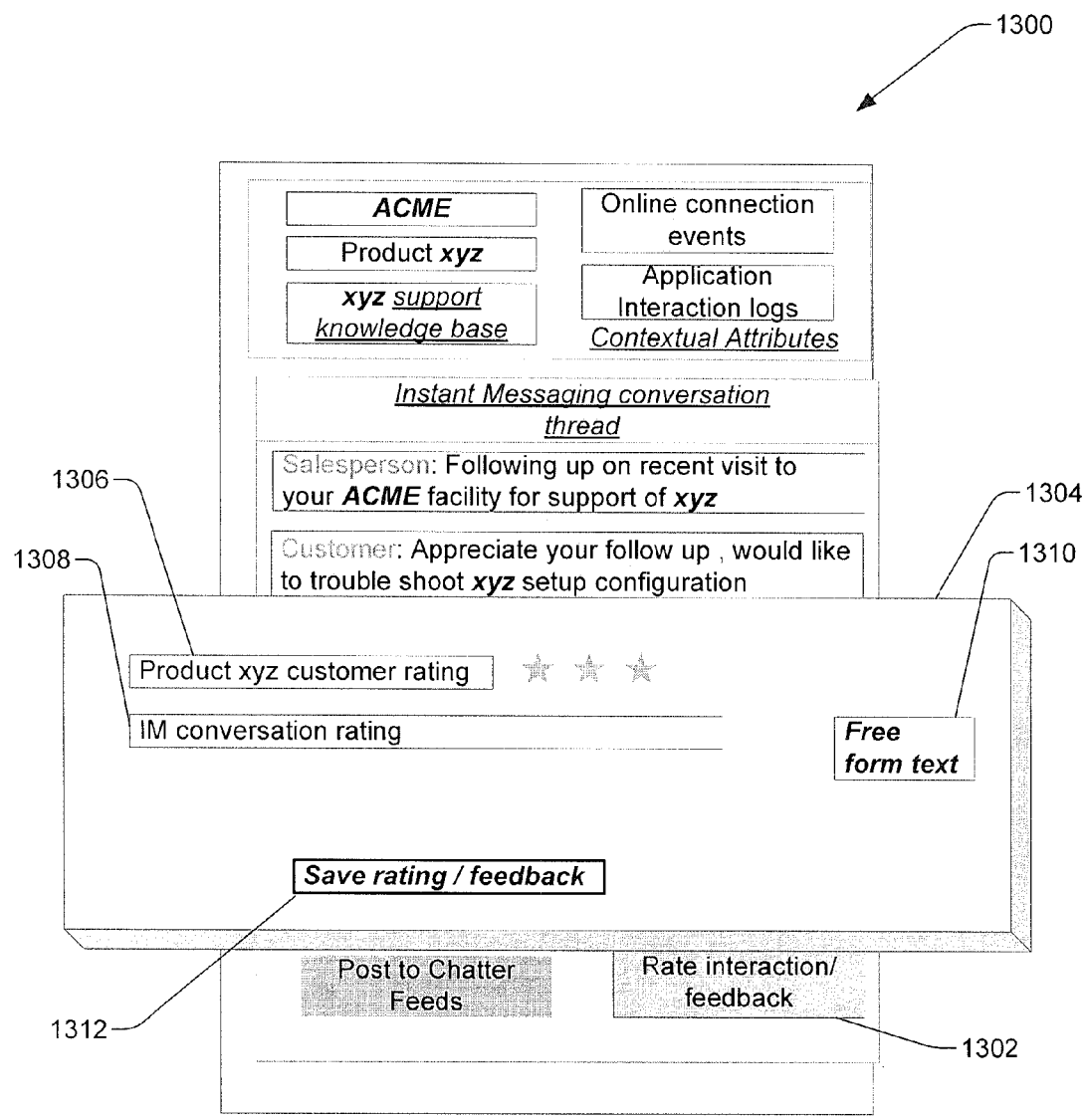
FIG. 13 illustrates an example of an image of a user interface screen that may be used to update information stored in CRM database based on information extracted from a communications tool.

FIG. 13 illustrates an example of an image of a user interface screen that may be used to update information stored in CRM database based on information extracted from a communications tool. As similarly discussed above with reference to FIG. 9, FIG. 10, and FIG. 11, user interface screen 1300 may include various data fields that display an instant messaging conversation thread and context attributes which have been identified and displayed based on, among other things, the contents of the conversation thread. User interface screen 1300 may also include data field 1302 which may be configured to receive an input from a user that causes a system component, such as a context attribute interface, to display a data field that enables the posting of the information associated with the conversation thread to one or more other databases, such as a CRM database that may be associated with an entity mentioned in the conversation. For example, because product xyz was mentioned in the conversation thread, a portion of a database in a CRM system that is associated with product xyz may be accessed. In some implementations, the user may provide an input to provide feedback or sentiment analysis for product xyz and interactions with sales representatives associated with product xyz. Accordingly, in response to receiving an input from a user, data field 1304 may be presented in user interface screen 1300.

Data field 1304 may include data field 1306 which provides information about one or more entities associated with the conversation thread. The entity may be the most relevant entity or heaviest weighted search term, as determined by method 800. Because product xyz was mentioned multiple times, it has been selected as the entity most relevant to the conversation thread. Accordingly, data field 1306 displays information about product xyz, such as its name. Furthermore, data field 1306 may be configured to receive an input from a user, such as a customer rating. User interface screen 1300 shows that the user has provided a rating of three stars.

Data field 1304 may further include data field 1308, which may receive a rating associated with the conversation thread itself. Thus, the customer may rate his or her satisfaction with the salesperson. In some implementations, data field 1304 may also include data field 1310 which may expand to allow a user to enter a text response.

Once the user has finished providing feedback, the user may provide an input to data field 1312, which may be configured to update information stored in the CRM database. Thus, the ratings provided by the user may be stored in the CRM database and processed according to one or more statistical operations to generate one or more metrics or performance and satisfaction for product xyz and the salesperson.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for providing a contextual view for a communication tool, the method comprising:

providing a context attribute interface between the communication tool and one or more context sources, the communication tool presenting a graphical user interface; extracting-through software associated with the context attribute interface, context attributes from generated text from a real-time conversation between two or more users using the communication tool via the graphic user interface, the conversation generating text included in a conversation thread, the context attributes describing interactions and data objects associated with one or more entities;

assigning through software associated with the context attribute interface, one or more scores to the extracted context attributes based on contents of the conversation thread, the scores providing a rank for each of the extracted context attributes; and modifying through software associated with the context attribute interface, a presentation of the graphical user interface of the communication tool based on the one or more scored context attributes.

2. The method of claim 1, wherein the extracting comprises parsing and analyzing text included in the conversation thread.

3. The method of claim 2, wherein the analyzing comprises comparing the parsed text with a list of entities associated with an on-demand service.

4. The method of claim 2 further comprising retrieving one or more context attributes from a context data store based on one or more entities extracted from the conversation thread.

5. The method of claim 1, wherein the scores are assigned based on one or more context attributes associated with the two or more users of the conversation thread.

6. The method of claim 1, wherein the modifying comprises displaying a ranked list of the scored context attributes.

7. The method of claim 6, wherein the ranked list is displayed in a data field, the data field annotating the conversation thread with one or more context attributes in response to receiving an input.

8. The method of claim 1 further comprising:
updating the presentation of the user interface based on the one or more changed context attributes in response to determining that one or more context attributes has changed.

9. The method of claim 1, wherein the modifying comprises altering a presentation of text included in the conversation thread, the presentation being selected from a group consisting of: a font, a size, a style, and a color.

10. The method of claim 1, wherein the modifying comprises changing a format of one or more user interface components included in the user interface to a format that is compatible with a mobile communications device.

11. The method of claim 1, wherein the context attributes include connection event data retrieved from a connection event database.

12. A computer program product comprising computer-readable program code to be executed by one or more processors when retrieved from a non-transitory computer-readable medium, the program code including instructions to:
provide a context attribute interface between the communication tool and one or more context sources, the communication tool presenting a graphical user interface;
extract, through software associated with the context attribute interface, context attributes from generated text, from a real-time conversation between two or more users using the communication tool via the graphic user interface, the conversation generating text included in a conversation thread, the context attributes describing interactions and data objects associated with one or more entities;
assign through software associated with the context attribute interface, one or more scores to the extracted context attributes based on contents of the conversation thread, the scores providing a rank for each of the extracted context attributes; and
modify, through software associated with the context attribute interface, a presentation of a user interface of a communication tool based on the one or more scored context attributes.

13. The computer program product of claim 12, wherein the extracting comprises parsing text included in the conversation thread, and comparing the parsed text with a list of entities associated with an on-demand service.

14. The computer program product of claim 12, wherein the scores are assigned based on one or more context attributes associated with the two or more users of the conversation thread.

15. The computer program product of claim 12, wherein the modifying comprises displaying a ranked list of the scored context attributes in a data field, the data field annotating the conversation thread with one or more context attributes in response to receiving an input.

16. The computer program product of claim 12, wherein the program code includes further instructions to:
update the presentation of the user interface based on the one or more changed context attributes in response to the determination that one or more context attributes has changed.

17. A system for providing a contextual view for a communication tool comprising:
a processor; and
one or more stored sequences of instructions which, when executed by the processor, cause the processor to:
provide a context attribute interface between the communication tool and one or more context sources, the communication tool presenting a graphical user interface;
extract, through software associated with the context attribute interface, context attributes from generated text from a real-time conversation between two or more users using the communication tool via the graphic user interface, the conversation generating text included in a conversation thread, the context attributes describing interactions and data objects associated with one or more entities;
assign through software associated with the context attribute interface, one or more scores to the extracted context attributes based on contents of the conversation thread, the scores providing a rank for each of the extracted context attributes; and modify, through software associated with the context attribute interface, a presentation of a user interface of a communication tool based on the one or more scored context attributes.

18. The system of claim 17, wherein the extracting comprises parsing text included in the conversation thread, and comparing the parsed text with a list of entities associated with an on-demand service.

19. The system of claim 17, wherein the modifying comprises displaying a ranked list of the scored context attributes in a data field, the data field annotating the conversation thread with one or more context attributes in response to receiving an input.

20. The system of claim 17, wherein the steps further comprise:
in response to determining that one or more context attributes has changed, updating the presentation of the user interface based on the one or more changed context attributes.

* * * * *